United States Patent
Wright et al.

(10) Patent No.: US 12,481,982 B2
(45) Date of Patent: Nov. 25, 2025

(54) WALLET APPLICATION INSTANTIATION, KEYS DERIVATION FOR SIGNING BLOCKCHAIN TRANSACTIONS USING A PUF DEVICE

(71) Applicant: nChain Licensing AG, Zug (CH)

(72) Inventors: Craig Steven Wright, London (GB); Jack Owen Davies, London (GB)

(73) Assignee: nChain Licensing AG, Zug (CH)

( * ) Notice: Subject to any disclaimer, the term of this patent is extended or adjusted under 35 U.S.C. 154(b) by 12 days.

(21) Appl. No.: 18/559,774

(22) PCT Filed: Apr. 12, 2022

(86) PCT No.: PCT/EP2022/059690
§ 371 (c)(1),
(2) Date: Nov. 8, 2023

(87) PCT Pub. No.: WO2022/238071
PCT Pub. Date: Nov. 17, 2022

(65) Prior Publication Data
US 2024/0232863 A1    Jul. 11, 2024

(30) Foreign Application Priority Data
May 12, 2021 (GB) ..................... 2106721

(51) Int. Cl.
G06Q 20/00   (2012.01)
G06Q 20/36   (2012.01)
H04L 9/08    (2006.01)

(52) U.S. Cl.
CPC ....... *G06Q 20/3674* (2013.01); *H04L 9/0861* (2013.01)

(58) Field of Classification Search
CPC ............ G06Q 20/3674; G06Q 20/4014; H04L 9/0861; H04L 9/3236; H04L 9/3247;
(Continued)

(56) References Cited

U.S. PATENT DOCUMENTS 8,699,714 B2   4/2014 Tuyls et al.
8,868,923 B1  10/2014 Hamlet et al.
(Continued)

FOREIGN PATENT DOCUMENTS

CN   108369697 A   8/2018
CN   109150972 A   1/2019
(Continued)

OTHER PUBLICATIONS

Relay R., "Hardware Wallets Explained," Medium, Feb. 27, 2019, [Retrieved on: Jan. 27, 2021], 7 pages, Retrieved from the Internet: URL: https://medium.com/radartech/hardware-wallets-explained-da8bd93ce801.
(Continued)

*Primary Examiner* — Dante Ravetti
(74) *Attorney, Agent, or Firm* — Messner Reeves LLP

(57) ABSTRACT

A challenge is input to a PUF device comprising a physically unclonable function, PUF. The device generates a corresponding response. A wallet application is instantiated to use a seed determined from the response, the instantiating comprising storing a transform of the seed or response in association with the wallet application. At a later time, a user supplies the wallet application with information demonstrating a right to use the seed, wherein the wallet application is configured so as in response to verify this information based on the transform as stored in association with the wallet application, and on condition that the information is thereby verified, to derive at least one child key from the seed. A blockchain transaction is then signed using the child key as derived by the wallet application in response to the verification.

25 Claims, 8 Drawing Sheets

(58) Field of Classification Search
CPC ....... H04L 9/50; H04L 9/3278; H04L 9/3234; H04L 9/3265; H04L 63/0853; H04L 67/1097; G06F 2213/0042
USPC .................. 705/16, 21, 59; 380/44, 262, 278
See application file for complete search history.

(56) References Cited

U.S. PATENT DOCUMENTS

| | | | |
|---|---|---|---|
| 10,050,785 | B2 | 8/2018 | Tuyls et al. |
| 10,250,708 | B1 | 4/2019 | Carver et al. |
| 10,256,983 | B1 | 4/2019 | Bauer et al. |
| 10,554,405 | B1 | 2/2020 | Endress et al. |
| 11,288,736 | B1 | 3/2022 | Jette et al. |
| 11,531,985 | B2 | 12/2022 | Weight et al. |
| 2002/0101988 | A1 | 8/2002 | Jones |
| 2003/0204743 | A1 | 10/2003 | Devadas et al. |
| 2007/0125857 | A1 | 6/2007 | Tuyls et al. |
| 2009/0083833 | A1 | 3/2009 | Ziola et al. |
| 2009/0282259 | A1 | 11/2009 | Skoric et al. |
| 2011/0066670 | A1 | 3/2011 | Yu |
| 2012/0242459 | A1 | 9/2012 | Lambert |
| 2013/0142329 | A1 | 6/2013 | Bell et al. |
| 2015/0019441 | A1 | 1/2015 | Brown et al. |
| 2015/0095240 | A1 | 4/2015 | Specogna et al. |
| 2019/0080392 | A1 | 3/2019 | Youb et al. |
| 2019/0130391 | A1 | 5/2019 | Wright et al. |
| 2019/0213371 | A1 | 7/2019 | Endress et al. |
| 2019/0334730 | A1 | 10/2019 | Endress et al. |
| 2019/0394047 | A1 | 12/2019 | Karame et al. |
| 2020/0076624 | A1 | 3/2020 | Cambou |
| 2020/0153627 | A1 | 5/2020 | Wentz |
| 2020/0162271 | A1 | 5/2020 | Cambou |
| 2020/0259653 | A1 | 8/2020 | Endress et al. |
| 2020/0322132 | A1 | 10/2020 | Covaci et al. |
| 2020/0344058 | A1 | 10/2020 | Wang et al. |
| 2021/0058233 | A1* | 2/2021 | Lee ..................... H04L 9/3247 |
| 2021/0124817 | A1 | 4/2021 | Todd et al. |
| 2021/0390549 | A1 | 12/2021 | Rule et al. |
| 2022/0021526 | A1 | 1/2022 | Dugardin et al. |
| 2022/0147974 | A1 | 5/2022 | Law et al. |
| 2022/0231841 | A1 | 7/2022 | Delsuc et al. |
| 2022/0263668 | A1 | 8/2022 | Autiosalo et al. |
| 2022/0286303 | A1 | 9/2022 | Woo |
| 2023/0037023 | A1 | 2/2023 | Iwamura et al. |
| 2023/0098747 | A1 | 3/2023 | Vijayaraghavan |

FOREIGN PATENT DOCUMENTS

| | | |
|---|---|---|
| CN | 111371868 A | 7/2020 |
| CN | 111488624 A | 8/2020 |
| EP | 1221120 A1 | 7/2002 |
| EP | 1683298 B1 | 9/2008 |
| EP | 2779067 A1 | 9/2014 |
| EP | 2526505 B1 | 6/2015 |
| EP | 1815637 B1 | 4/2016 |
| EP | 3340212 A1 | 6/2018 |
| EP | 3716525 A1 | 9/2020 |
| GB | 2592980 A | 9/2021 |
| JP | 2007513396 A | 5/2007 |
| JP | 2007293703 A | 11/2007 |
| JP | 2011123909 A | 6/2011 |
| JP | 2019121885 A | 7/2019 |
| WO | 03090259 A2 | 10/2003 |
| WO | 2019116032 A1 | 6/2019 |
| WO | 2020178752 A1 | 9/2020 |
| WO | 2020183035 A1 | 9/2020 |
| WO | 2021059054 A1 | 4/2021 |

OTHER PUBLICATIONS

Ruhrmair U., et al., "Modeling Attacks on Physical Unclonable Functions," Proceedings of the 17th ACM Conference on Computer and Communications Security, Oct. 4, 2010, [Retrieved on Sep. 16, 2020], 11 pages.

Ruhrmair U., et al., PUFs at a Glance, Design, Automation & Test in Europe Conference & Exhibition (DATE), Mar. 2014, 6 pages, Retrieved from the Internet: URL: https://spqrlab1.github.io/papers/holcomb_PUFs_date14.pdf.

Schrijen G-J., SRAM PUF: A Closer Look at the Most Reliable and Most Secure PUF, Intrinsic ID, 2020, 3 pages, Retrieved from the Internet: URL: https://www.design-reuse.com/articles/47782/sram-puf-a-closer-look-at-the-most-reliable-and-most-secure-puf.html.

Sutar S., et al., "Memory-Based Combination PUFs for Device Authentication in Embedded Systems," IEEE Transactions on Multi-Scale Computing Systems, vol. 4 (4), Oct. 2018, pp. 793-810.

Weather SV, Retrieved on Aug. 20, 2020, 2 pages, Retrieved from the Internet: URL: https://weathersv.app/find.

Wisiol N., et al., "Breaking the Lightweight Secure PUF: Understanding the Relation of Input Transformations and Machine Learning Resistance," International Association for Cryptologic Research, retrieved from the Internet: URL: https://eprint.iacr.org/2019/799.pdf, on Jul. 10, 2019, 10 pages.

Wuille P., "Hierarchical Deterministic Wallets," GitHub, Retrieved from the Internet: URL:https://github.com/bitcoin/bips/blob/master/bi p-0032, MediaWiki, Feb. 11, 2012, pp. 1-18.

Zhang J., et al., "A PUF-FSM Binding Scheme for FPGA IP Protection and Pay-Per-Device Licensing," IEEE Transactions on Information Forensics and Security, Jun. 2015, vol. 10, No. 6, pp. 1137-1150, Retrieved from the Internet: URL: 10.1109/tifs.2015.2400413.

Zhang W., "Simplified Payment Verification," Aug. 25, 2020, 7 pages, Retrieved from the Internet: URL: https://medium.com/nchain/simplified-payment-verification-48ac60f1 b26c.

Analog Devices, Embedded Security and 1-Wire [Retrieved on Feb. 20, 2023], 2 pages, Retrieved from the Internet: URL: https://www.analog.com/en/product-category/embedded-security-and-1wire.html.

Ardis K., Demystifying the Physically Unclonable Function (PUF), Feb. 1, 2019, Embedded Computing Design, 7 pages, Retrieved from the Internet: URL: https://embeddedcomputing.com/technology/processing/semiconductor-ip/demystifying-the-physically-unclonable-function-puf.

Asif R., et al., "Proof-of-PUF Enabled Blockchain: Concurrent Data and Device Security for Internet-of-Energy," Sensors, Dec. 23, 2020, vol. 21, No. 1,32 pages.

Bitstagram, "Bitcoin Genesis Block," 2018, Retrieved from the Internet: https://bitstagram.bitdb.network/, 4 pages.

Braeken A., "PUF Based Authentication Protocol for IoT," Symmetry, MDPI, vol. 10, Aug. 20, 2018, 16 pages.

BSV Explorer, "Mainnet Summary," Retrieved on Aug. 20, 2020, 2 pages, Retrieved from the Internet: URL: https://whatsonchain.com/.

Bush S., "Chip Combines Secure Hash Algorithm and PUF to Protect IoT, Industrial and Medical," Electronics Weekly, Apr. 8, 2019, 2 pages, Retrieved from the Internet: URL: https://www.electronicsweekly.com/news/products/digital-integrated-circuits/chip-combines-secure-hash-algorithm-puf-protect-iot-industrial-medical-2019-04/.

Combined Search and Examination Report under Sections 17 and 18(3) for Application No. GB2015475.3, mailed on Jul. 12, 2021,12 pages.

Combined Search and Examination Report under Sections 17 and 18(3) for Application No. GB2015477.9, mailed on Mar. 26, 2021,8 pages.

Combined Search and Examination Report under Sections 17 and 18(3) for Application No. GB2015487.8, mailed on Mar. 26, 2021,08 pages.

Combined Search and Examination Report under Sections 17 and 18(3) for Application No. GB2015498.5, mailed on Mar. 25, 2021,6 pages.

Combined Search and Examination Report under Sections 17 and 18(3) for Application No. GB2015508.1, mailed on Mar. 31, 2021,05 pages.

Combined Search and Examination Report under Sections 17 and 18(3) for Application No. GB2015541.2, mailed on Jul. 30, 2021,10 pages.

(56) References Cited

OTHER PUBLICATIONS

Connolly D., "Bitcoin SV," GitHub 2018, retrieved from the internet: https://github.com/bitcoin-sv/bitcoin-sv, 2 pages.

Dahlberg R., et al., "Efficient Sparse Merkle Trees Caching Strategies and Secure (Non-) Membership Proofs," 2016, retrieved from the internet: https://eprint.iacr.org/2016/683.pdf, 16 pages.

EE Journal, "ChipDNA: Defend your IoT Designs from Hackers," YouTube, Dec. 4, 2017, 1 page, Retrieved from the Internet: URL: https://www.youtube.com/watch?v=awcbUYNbooQ.

Gao Y., et al., "PUF-FSM: A Controlled Strong PUF," IEEE Transactions on Computer-Aided Design of Integrated Circuits and Systems, 2017, 5 pages, Retrieved from the Internet: URL: 10.1109/tcad.2017.2740297.

Gassend B., et al., "Controlled Physical Random Functions and Applications," ACM Transactions on Information and System Security, Jan. 22, 2008, [Retrieved on Sep. 16, 2020], vol. 10, No. 4, pp. 22 pages.

Gassend B., et al., "Controlled Physical Random Functions," 18th Annual Computer Security Applications Conference, Dec. 2002, [Retrieved on Sep. 16, 2020], 12 pages.

Gassend B., et al., "Silicon Physical Random Functions," Proceedings of the 9th ACM conference on Computer and Communications Security, Nov. 18, 2002, [Retrieved on Sep. 16, 2020], 13 pages.

Guin U., et al., "Ensuring Proof-of-Authenticity of IoT Edge Devices Using Blockchain Technology," IEEE International Conference on Internet of Things (iThings) and IEEE Green Computing and Communications (GreenCom) and IEEE Cyber, Physical and Social Computing (CPSCom) and IEEE Smart Data (SmartData), Jul. 30, 2018, pp. 1042-1049.

Hearn M., et al., "Connection Bloom filtering," Retrieved on Aug. 20, 2020, 10 pages, Retrieved from the Internet : URL: https://github.com/bitcoin/bips/wiki/Comments:BIP-0037.

Herder C., et al., "Physical Unclonable Functions and Applications: A Tutorial," Proceedings of the IEEE, Aug. 2014, vol. 102, No. 8, pp. 1126-1141, Retrieved from the Internet: URL: 10.1109/jproc,2014.2320516.

Hou S., et al., "A Lightweight and Secure-Enhanced Strong PUF design on FPGA," IEICE Electronics Express, Dec. 2019, [Retrieved on Sep. 16, 2020], vol. 16, No. 24, 6 pages, Retrieved from the Internet: URL: 10.1587/elex. 16.20190695.

Huang H., et al., "Bitcoin-Based Fair Payments for Outsourcing Computations of Fog Devices," Future Generation Computer Systems, Jan. 2018, vol. 78, pp. 850-858, Retrieved from the Internet: URL: https://www.researchgate.net/publication/312384979_Bitcoin-based_fair_payments_for_outsourcing_computations_of_fog_devices.

International Search Report and Written Opinion for International Application No. PCT/EP2022/050955 mailed May 13, 2022, 13 pages.

International Search Report and Written Opinion for International Application No. PCT/EP2022/059690 mailed Jul. 29, 2022, 12 pages.

International Search report and Written Opinion issued in International Application No. PCT/EP2021/073961, mailed on Nov. 10, 2021, 13 pages.

International Search report and Written Opinion issued in international Application No. PCT/EP2021/073964, mailed on Nov. 10, 2021, 14 pages.

International Search report and Written Opinion issued in International Application No. PCT/EP2021/073969, mailed on Dec. 2, 2021, 17 pages.

International Search report and Written Opinion issued in International Application No. PCT/EP2021/073986, mailed on Dec. 2, 2021,18 pages.

International Search report and Written Opinion issued in International Application No. PCT/EP2021/073991, mailed on Feb. 28, 2022, 16 pages.

International Search report and Written Opinion issued in International Application No. PCT/EP2021/073999, mailed on Dec. 8, 2021, 15 pages.

International Search report and Written Opinion issued in International Application No. PCT/EP2022/056543, mailed on Jun. 21, 2022, 14 pages.

Intrinsic ID, "SRAM PUF Technology," IoT Security, [Retrieved on Sep. 16, 2020], 1 page, Retrieved from the Internet: URL: https://www.intrinsic-id.com/sram-puf/.

Intrinsic ID, Protecting a Device's Root Secrets with SRAM PUF An Intrinsic ID Whiteboard Video, YouTube, Jan. 13, 2020, https://www.youtube.com/watch?v=22x8QUcp8is.

Intrinsic ID., SRAM PUF: The Secure Silicon Fingerprint, White Paper, 2017, 6 pages, Retrieved from the Internet: URL: https://www.semanticscholar.org/paper/SRAM-PUF-%3A-The-Secure-Silicon-Fingerprint/e823f6078233b3f9e826f7570e794689b354f1 a1.

Islam M.N., et al., "Enabling IC Traceability via Blockchain Pegged to Embedded PUF," ACM Transactions on Design Automation of Electronic Systems, Apr. 5, 2019, vol. 24, No. 3, 23 pages, Retrieved from the Internet: URL: https://dl.acm.org/doi/pdf/10.1145/3315669.

Islam., M.N., et al., "Remote Configuration of Integrated Circuit Features and Firmware Management via Smart Contract," 2019 IEEE International Conference on Blockchain (Blockchain), Jul. 14, 2019, pp. 325-331.

Keane S., "The Huawei Controversy: Everything You Need To Know," Security, Feb. 22, 2019, retrieved from the internet: https://www.cnet.com/news/the-huawei-controversy-everything-you-need-to-know/, 1 page.

Longo R., et al., "Threshold Multi-Signature with an Offline Recovery Party," IACR, International Association For Cryptologic Research, vol. 160305, [Retrieved on Jan. 7, 2020], 31 pages, Retrieved from the Internet: URL: https://eprint.iacr.org/2020/023.pdf.

Maxim Integrated, How ChipDNA PUF Technology Protects Your Secrets, Jan. 28, 2019, YouTube, 1 page, https ://www.youtube, co m/watch?v=b2AucKwx9ec.

Merkle R.C., "Secrecy, Authentication, And Public Key Systems," Information System Laboratory, Jun. 1979, Technical Report No. 1979-1, retrieved from the internet: http://www.ralphmerkle.com/papers/Thesis1979.pdf, 193 pages.

Mohanty S.P., et al., "PUFchain: Hardware-Assisted Blockchain for Sustainable Simultaneous Device and Data Security in the Internet of Everything (IoE)," arxiv.org, Sep. 14, 2019, 38 pages.

Mouser Electronics, "Maxim's DS2477 Secure I$^2$C Coprocessor, Now at Mouser, Delivers Authentication and Physical Security," Apr. 4, 2019, 1 page, Retrieved from the Internet: URL: https://eu.mouser.com/publicrelations_maxim_ds2477_2019final/.

Mouser Electronics, Maxim Integrated DS2477 Secure I2C Coprocessor, Mar. 8, 2019, 2 pages, Retrieved from the Internet: URL: https://eu.mouser.com/new/maxim-integrated/maxim-ds2477-coprocessor/.

Nakamoto S., "Bitcoin: A Peer-to-Peer Electronic Cash System," 2009 [Oct. 31, 2008], Retrieved from the internet: https://bitcoin.org/bitcoin.pdf, 9 pages.

Nakamoto S, Bitcoin: A Peer-to-Peer Electronic Cash System, Oct. 31, 2008, 6 pages, Retrieved from the Internet: URL: https://nakamotoinstitute.org/bitcoin/, on Feb. 18, 2020.

Obermaier J., et al., "An Embedded Key Management System for PUF-based Security Enclosures," 7th Mediterranean Conference on Embedded Computing (MECO), Jun. 2018, 6 pages.

Ravikanth P.S., "Physical One-Way Functions," Massachusetts Institute of Technology, Mar. 2001, 154 pages.

Mars A., et al., "Fair Exchange and Anonymous E-Commerce by Deploying Clone-Resistant Tokens," 2019 42nd International Convention on Information and Communication Technology, Electronics, and Microelectronics (MIPRO) May 2019, pp. 1226-1231.

\* cited by examiner

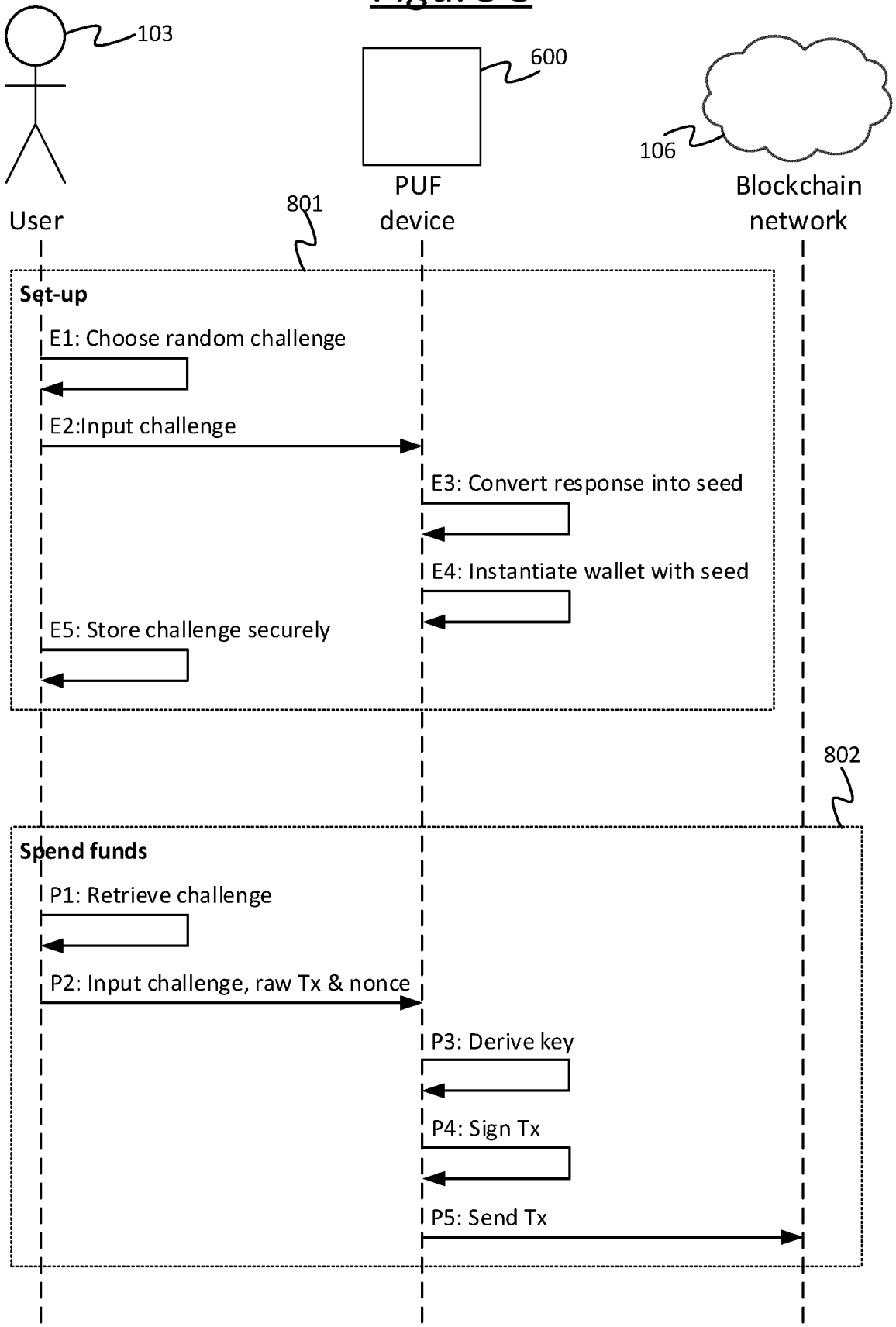

WALLET APPLICATION INSTANTIATION, KEYS DERIVATION FOR SIGNING BLOCKCHAIN TRANSACTIONS USING A PUF DEVICE

CROSS REFERENCE TO RELATED APPLICATIONS

This application is the U.S. National Stage of International Application No. PCT/EP2022/059690 filed on Apr. 12, 2022, which claims the benefit of United Kingdom Patent Application No. 2106721.0, filed on May 12, 2021, the contents of which are incorporated herein by reference in their entireties.

TECHNICAL FIELD

The present disclosure relates to a PUF device comprising a physically unclonable function (PUF).

BACKGROUND

A physically unclonable function (PUF) is a term of art referring to a function comprising a deterministic but unpredictable physical phenomenon. A PUF is also sometimes referred to as a physical random function. A PUF receives an input, referred to as a "challenge", and generates an output, referred to as the corresponding "response", in dependence on the challenge and the physical phenomenon employed by the PUF. PUFs are sometimes classified into strong and weak PUFs. A strong PUF is capable of generating a respective response for a large number of different challenges, typically being able to take any arbitrary value of the challenge. A weak PUF can generate a response for only a single response or a small number of responses (typically the challenge cannot take any arbitrary value). In other words, a strong PUF has a large number of challenge-response pairs (it has a large challenge-response space), whilst a weak PUF has a single challenge-response pair or limited number of challenge-response pairs (a small or limited challenge-response space). According to one definition, a weak PUF has a number of responses that grows linearly with the number of challenge bits, or more generally one that does not grow more than linearly with the number of challenge bits or any other parameters (in other words, a weak PUF can't have its challenge-response space scaled up, i.e. at best it scales linearly).

A known example of a strong PUF is an optical PUF. For instance, an optical PUF may comprise a laser, an optical sensor, and a solid optical medium with bubbles or other such artefacts set in the medium. The laser is shone through the optical medium at a controllable angle to create a diffraction or scattering pattern (which is an effect of the bubbles or artefacts in the medium). The sensor is arranged to sense this pattern. The challenge is the angle of the laser, and the response is generated based on the sensed pattern.

An example of a weak PUF is an SRAM PUF. In this case the challenge is turning on the SRAM (static random access memory). Due to slight manufacturing differences from one SRAM to another, then the SRAM cells will happen to fall into a unique pattern of 0/1 states upon power up, which thus forms a characteristic fingerprint of the individual SRAM. The PUF is configured to output this as the response upon power-up.

A PUF can be used as a means to generate a key, such as for use in cryptographic algorithms (e.g. to sign or encrypt a document). Another application of a PUF is for identification of a device such as a computer device that incorporates the PUF. If the expected response for a given challenge has previously been determined, then a verifying party can later challenge a target device with the challenge and check whether it gives the expected response, and thereby check whether the target device is the device associated with the expected response.

Because of the limited challenge response space, the input-output (i/o) interface to a weak PUF tends to be restricted to only one or a restricted number of parties (e.g. only one or a limited number of trusted parties may be physically or legally granted access to the PUF, or the interface to the PUF may be password protected or the like). I.e. only the party or parties in question can gain access to the input to the PUF needed to submit the challenge and the output from which the response is received back. For strong PUFs on the other hand, the i/o interface to a strong PUF may be made widely available to a large or unlimited number of parties, not all of whom are necessarily known or trusted parties. The reason is that the challenge response space is large enough that it is infeasible for an adversary to enumerate all of the challenge-response pairs, and therefore the ability for an adversary to freely access the PUF should not compromise its security by allowing an enumeration and spoofing of the PUF, as would be the case for weak PUFs.

In a different area of technology, a blockchain refers to a form of distributed data structure whereby a duplicate copy of the blockchain is maintained at each of a plurality of nodes in a distributed peer-to-peer (P2P) network (referred to below as a "blockchain network") and widely publicised. The blockchain comprises a chain of blocks of data, wherein each block comprises one or more transactions. Each transaction, other than so-called "coinbase transactions", points back to a preceding transaction in a sequence which may span one or more blocks going back to one or more coinbase transactions. Coinbase transactions are discussed further below. Transactions that are submitted to the blockchain network are included in new blocks. New blocks are created by a process often referred to as "mining", which involves each of a plurality of the nodes competing to perform "proof-of-work", i.e. solving a cryptographic puzzle based on a representation of a defined set of ordered and validated pending transactions waiting to be included in a new block of the blockchain. It should be noted that the blockchain may be pruned at some nodes, and the publication of blocks can be achieved through the publication of mere block headers.

The transactions in the blockchain may be used for one or more of the following purposes: to convey a digital asset (i.e. a number of digital tokens), to order a set of entries in a virtualised ledger or registry, to receive and process timestamp entries, and/or to time-order index pointers. A blockchain can also be exploited in order to layer additional functionality on top of the blockchain. For example blockchain protocols may allow for storage of additional user data or indexes to data in a transaction. There is no pre-specified limit to the maximum data capacity that can be stored within a single transaction, and therefore increasingly more complex data can be incorporated. For instance this may be used to store an electronic document in the blockchain, or audio or video data.

Nodes of the blockchain network (which are often referred to as "miners") perform a distributed transaction registration and verification process, which will be described in more detail later. In summary, during this process a node validates transactions and inserts them into a block template for which they attempt to identify a valid proof-of-work solution. Once a valid solution is found, a new block is propagated to other nodes of the network, thus enabling each node to record the new block on the blockchain. In order to have a transaction recorded in the blockchain, a user (e.g. a blockchain client application) sends the transaction to one of the nodes of the network to be propagated. Nodes which receive the transaction may race to find a proof-of-work solution incorporating the validated transaction into a new block. Each node is configured to enforce the same node protocol, which will include one or more conditions for a transaction to be valid. Invalid transactions will not be propagated nor incorporated into blocks. Assuming the transaction is validated and thereby accepted onto the blockchain, then the transaction (including any user data) will thus remain registered and indexed at each of the nodes in the blockchain network as an immutable public record.

The node who successfully solved the proof-of-work puzzle to create the latest block is typically rewarded with a new transaction called the "coinbase transaction" which distributes an amount of the digital asset, i.e. a number of tokens. The detection and rejection of invalid transactions is enforced by the actions of competing nodes who act as agents of the network and are incentivised to report and block malfeasance. The widespread publication of information allows users to continuously audit the performance of nodes. The publication of the mere block headers allows participants to ensure the ongoing integrity of the blockchain.

In an "output-based" model (sometimes referred to as a UTXO-based model), the data structure of a given transaction comprises one or more inputs and one or more outputs. Any spendable output comprises an element specifying an amount of the digital asset that is derivable from the proceeding sequence of transactions. The spendable output is sometimes referred to as a UTXO ("unspent transaction output"). The output may further comprise a locking script specifying a condition for the future redemption of the output. A locking script is a predicate defining the conditions necessary to validate and transfer digital tokens or assets. Each input of a transaction (other than a coinbase transaction) comprises a pointer (i.e. a reference) to such an output in a preceding transaction, and may further comprise an unlocking script for unlocking the locking script of the pointed-to output. So consider a pair of transactions, call them a first and a second transaction (or "target" transaction). The first transaction comprises at least one output specifying an amount of the digital asset, and comprising a locking script defining one or more conditions of unlocking the output. The second, target transaction comprises at least one input, comprising a pointer to the output of the first transaction, and an unlocking script for unlocking the output of the first transaction.

In such a model, when the second, target transaction is sent to the blockchain network to be propagated and recorded in the blockchain, one of the criteria for validity applied at each node will be that the unlocking script meets all of the one or more conditions defined in the locking script of the first transaction. Another will be that the output of the first transaction has not already been redeemed by another, earlier valid transaction. Any node that finds the target transaction invalid according to any of these conditions will not propagate it (as a valid transaction, but possibly to register an invalid transaction) nor include it in a new block to be recorded in the blockchain.

An alternative type of transaction model is an account-based model. In this case each transaction does not define the amount to be transferred by referring back to the UTXO of a preceding transaction in a sequence of past transactions, but rather by reference to an absolute account balance. The current state of all accounts is stored by the nodes separate to the blockchain and is updated constantly.

SUMMARY

The present disclosure provides a method for instantiating a wallet application and deriving keys for signing blockchain transactions using a PUF device.

According to one aspect disclosed herein, there is provided a method comprising: inputting an input challenge to a PUF device which includes a PUF module comprising a physically unclonable function, PUF. The PUF device is configured to generate a corresponding output response based on the input challenge and the PUF in response to the inputting of the input challenge. The method further comprises instantiating a wallet application to use a seed determined from the output response as generated by the PUF device in response to said inputting of the input challenge. This instantiating comprises storing a transform of the seed or output response in association with the wallet application. At a later time, a user supplies the wallet application with information demonstrating a right to use the seed, wherein the wallet application is configured so as in response to verify said information based on said transform as stored in association with the wallet application, and on condition that the information is thereby verified, to derive at least one child key from the seed. The method then comprises signing a blockchain transaction using the child key as derived by the wallet application in response to the verification, and transmitting the signed blockchain transaction to be recorded on a blockchain.

The PUF device can thus act as a replacement for a conventional hardware wallet, with a benefit that the source of entropy never need be stored on-disk. In a normal hardware wallet, the key is stored on-device, usually air-gapped and not connected to the Internet in any way. The owner then plugs in the device when they need to e.g. sign transactions and move funds. There is also usually a password or PIN that allows the user to authorise the use of the on-device stored keys. In the PUF-based hardware wallet, the usual PIN or password is replaced with a challenge, and a data key is replaced with the response of a physical system. The PUF device disclosed herein may enable similar functionality to existing hardware wallets, but without storing the master key on disk, or at least not in-the-clear. This protects it from physical attacks on the storage medium, which hardware wallets are still exposed to, to some degree.

BRIEF DESCRIPTION OF THE DRAWINGS

To assist understanding of embodiments of the present disclosure and to show how such embodiments may be put into effect, reference is made, by way of example only, to the accompanying drawings in which:

FIG. 8 is a signalling chart showing a second method according to embodiments disclosed herein.

DETAILED DESCRIPTION OF EMBODIMENTS

The robustness of systems such as key-generation systems and privacy-preserving identity systems for both humans and machines may be improved by the involvement of physically unclonable functions (PUFs). These may be parties and/or autonomous machines that are interacting with one another, or with a public system such as the blockchain.

These functions, which are based on physical systems and secured by the assumption of random, undeterminable and non-repeatable variations in the manufacturing of physical devices, can be used to fortify a link established between a human identity and their device, or furthermore to establish an unforgeable unique identity for a device itself.

In the literature, PUFs are categorised into weak and strong types, categorised by their distinct properties. In some embodiments below, there is also provided a generalised extended PUF (ePUF) framework for describing a practical PUF device that has the benefits of both of these types of PUF; namely that an ePUF may produce a large range of challenge-response pairs to be used in applications, while remaining practical and cost-efficient to implement.

1. PHYSICALLY UNCLONABLE FUNCTIONS (PUFS)—PRELIMINARIES

The term physically unclonable functions (PUFs) refers to a class of physical systems and devices which act as general-purpose random functions. These PUFs are uniquely characterised by their physical properties, often at the sub-micron scale, which means each can be uniquely identified and verified by probing those properties with physical stimuli. At a high level, one can consider PUFs as functions that map challenges to responses; pairs of which are often referred to as challenge-response pairs (CRPs). One can use the following notation to describe such a map F as:

$$F: C \to R \forall (C, R) \in \Phi_F,$$

where C, R denote challenges and responses respectively, and $\Phi_F$ is the set of all challenge-response pairs of the form (C, R) that can be produced by the PUF.

The unique physical properties of a PUF are typically the result of random process variations inherent in the manufacturing of physical devices, such as silicon chips. Assumptions typically made about PUFs are that:

1. it is intractable to completely determine the parameters of the physical system by any form of analysis; and
2. the parameters of the physical system are not known by any party, including the original manufacturer of the device that is used as a PUF. This assumption if often referred to as manufacturer-resistance.

These assumptions allow a PUF to be used to produce unpredictable yet deterministic responses to arbitrary challenges. This challenge-response process treats a PUF like a physical black box, as illustrated in FIG. 3.

Figure 3:
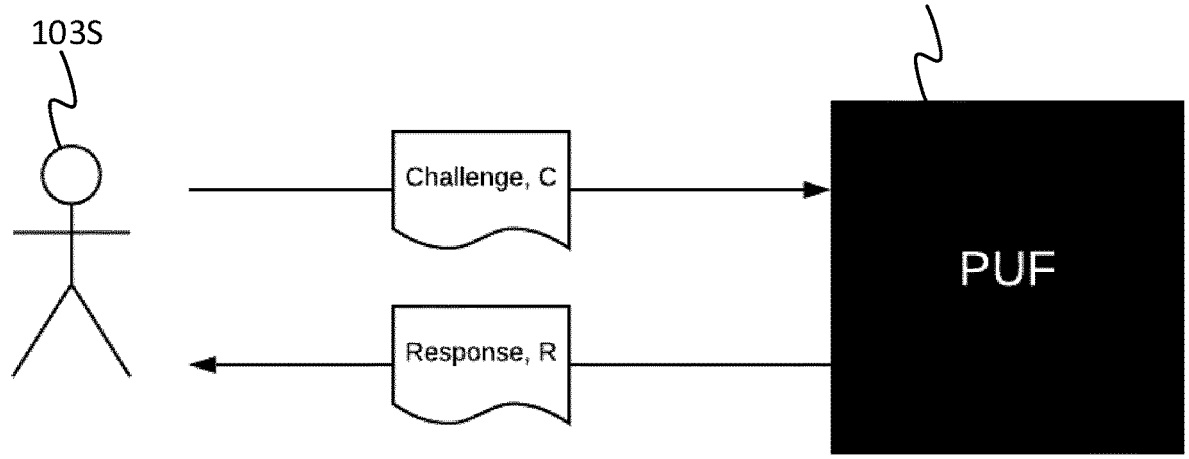

FIG. 3 shows a PUF 302 modelled as a physical black box. A submitting party 103S submits a challenge C as an input to the PUF 302, and in response the PUF 302 generates a corresponding response R. The submitting party submits the challenge from a device such as a computer device (not shown) of the submitting party, which could be the same or a different device as that in which the PUF 302 itself is implemented.

The submitting party 103S could be a party generating challenge-response (CR) pairs as part of a set-up phase (examples discussed later) to establish a set of expected responses linked to the identity of a target party or device. Or the submitting party 103S could be a verifying party submitting a challenge in a later verification phase in order to verify that the generated response matches an expected response, thus verifying the identity of a target device comprising the PUF 302 or a target party in possession of the PUF.

In another example scenario, the submitting party 103S may be a party who wishes to use the generated response as a key, or a seed to generate a key, for use in a cryptographic application such as a blockchain application (e.g. to sign a blockchain transaction).

Figure 4:
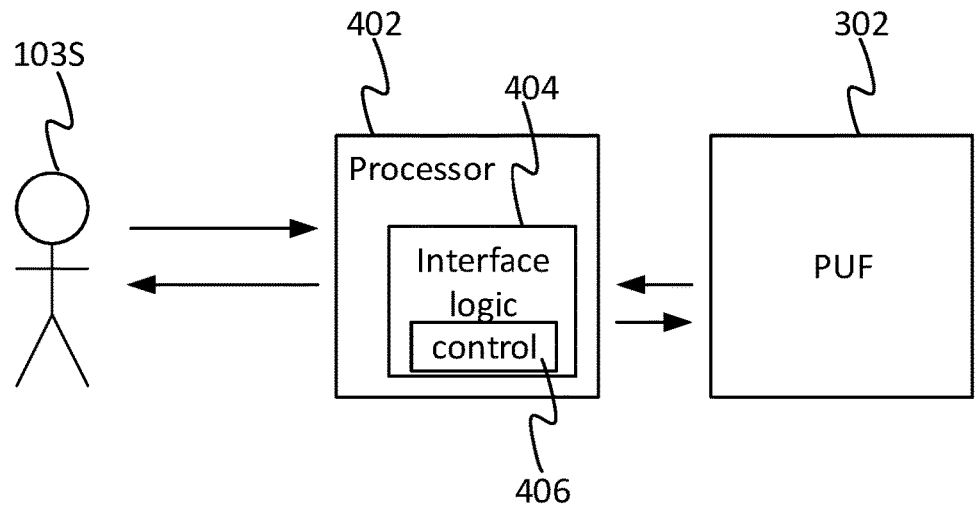
FIG. 4 is a schematic block diagram of a system comprising a PUF.

FIG. 4 shows a system comprising an example of an interface to a PUF 302. The system comprises a processor 402 and the PUF 302. The interface comprises interface logic 404, which is stored in memory and arranged to run on the processor 402. The memory in which the interface logic 404 is stored may comprise one or more memory units employing one or more storage media (e.g. magnetic medium such as magnetic disk or tape, or an electronic medium such as ROM, EPROM, EEPORM, flash memory, SRAM, DRAM, etc.). The processor 402 may comprise one or more processing units (e.g. a general purpose processor such as a CPU, or an application specific or accelerator processor such as a GPU, DSP or crypto-processor). It is also not excluded that the interface logic 404 could instead be implemented partially or wholly in dedicated hardware circuitry, or configurable or reconfigurable circuitry such as a PGA or FPGA.

The submitting party 103S uses a device (not shown) to submit a challengee C to the PUF 302 via the interface logic 404. The device used by the submitting party 103S could for example be a computer device, either an external computer device or the same computer device on which the processor 402 is implemented. The PUF 302 then returns the corresponding response R back to the device of the submitting party 302 via the interface logic 404. In some embodiments, discussed in more detail later, the interface logic 404 may comprise access control logic 406 which restricts access to the PUF 302 to only certain parties, e.g. those that can present recognized credentials such as a password, PIN or biometric information. And/or, a physical interface to the device comprising the processor 402 may be restricted, such as by being located in a room or complex to which only authorized personnel have access, or being kept in a locked box or cabinet. In alternative systems however, the interface logic 404 could be made available for any party to query with challenges.

The challenge-response process of a PUF allows the generation of pseudo-random data values by extracting these challenges from chosen responses. For example, PUFs can be used as key-generators to extract random repeatable data to be used in cryptography. Note that the PUF 302 acts in a deterministic and repeatable way, such that a PUF will yield an identical response when given the same challenge on multiple separate occasions.

There are a number of different physical systems that can be used as PUFs, and there are many different implementations of PUFs using these systems. An illustrative example of a PUF is an optical medium that contains bubbles, which, when probed by a laser, produces a response diffraction or 'speckle' pattern that is deterministically determined by (i) the position of the laser, and (ii) the small-scale parameters of the optical medium.

1.1. Classes of PUFs 1.1.1 Weak PUF: Weak PUFs are characterised by having a small challenge-response space, and many have only a single challenge such that the size of the CRP space is $|\Phi_F|=1$. In general, the challenge-response space for a weak PUF is considered to be of the order O(n), where n is the number of components in the PUF that are subject to uncontrollable manufacturing variations.

In the case of weak PUFs, it is typically also assumed that access to the responses of the PUF is restricted. This is because, due to the small number of CRPs serviced by the weak PUF, an adversary may enumerate all such pairs in a reasonable time and may therefore emulate or 'spoof' the behaviour of the PUF. This restriction is sometimes referred to as a restricted challenge-response interface when discussing the behaviour of weak PUFs.

These properties make weak PUFs most naturally suited to use in cryptographic applications as a key-generator, where the one (or few) CRP(s) generated by the PUF may be used as a secret key for cryptographic operations, such as for encrypting on-device non-volatile memory (NVM) or for use as an HMAC symmetric key. In such cases, the key derived from the response of the PUF must be kept secret and known only to the possessor of the device for both the security of the cryptographic processes performed and also of the PUF itself.

A prominent and widely-implemented example of a weak PUF is the SRAM PUF, where the term 'SRAM' refers to 'static random-access memory'. The design of the SRAM PUF leverages variations in the 'powered-on' state of SRAM chips, which each have a unique fingerprint owing to variations in which SRAM cells in the chip are in '0' or '1' states when the chip is powered-on.

In this case, the PUF construction is considered weak because there is one fixed mode to probe the PUF (i.e. by powering on the SRAM chip), and thus only a single CRP. In this case, the one and only 'challenge' is to supply the SRAM chip with power, and the response is the unique fingerprint derived from its powered-on state. Access-control, to ensure the secrecy of the response, can also be implemented using the existing memory access-control policy or mechanism in place on the device in which the SRAM PUF is used, or alternative mechanisms employed on the device.

A feature of some PUF implementations, such as in the case of the SRAM PUF, is the use of error-correction in the responses generated by PUFs to ensure the same challenge will yield the same response in a condition- and time-invariant manner. Details of such error-correction techniques are known to a person skilled in the art. In some cases, the error-correction process may require that PUF devices are 'enrolled' initially, to provide a source of helper data which is combined with a response later generated on demand to facilitate the error correction.

1.1.2. Strong PUFs: by contrast to weak PUFs, strong PUFs are characterised by having a large space of possible challenge-response pairs (CR-pairs, or CRPs) that can be utilised. This large space of CRPs means that it is considered infeasible for an adversary to enumerate all of the challenge-response pairs within the domain of a strong PUF in polynomial time. This property means that strong PUFs may have an unprotected challenge-response interface in general, since the ability for an adversary to freely access the PUF will not compromise its security by allowing an enumeration and spoofing of the PUF, as would be the case for weak PUFs. This class of PUFs is also said to produce unpredictable responses, even from the perspective of an adversary who knows a large subset of $\Phi_F$, meaning that strong PUFs act more like a cryptographic hash function with a large domain.

However, there is a restriction placed on strong PUFs that only the response R should be given by the PUF when presented with a challenge C, and no other information about the internal working or operation of the PUF should be leaked in the process. This restriction is to mitigate various analytical attacks whereby an adversary may try to characterise the physical system underpinning the behaviour of the PUF. These are often referred to as modelling attacks in the literature.

Similarly to weak PUFs, some strong PUF constructions may rely on error correction techniques to ensure the accuracy of responses generated by the devices.

The main existing applications of strong PUFs are to facilitate system authentication and identification using the inherent challenge-response mechanism. These mechanisms rely on protocols that involve the creation of CRPs as shared secrets directly between two parties, and often require at least one party to generate a table of CRPs ahead of time (an initial set-up) to be used as authentication tokens for the other party.

One of the earliest examples of a strong PUF implementation was the optical PUF system. In this construction, the PUF comprises an optical medium that contains randomly-distributed physical imperfections, as a result of manufacturing variations, which scatter incident light. This PUF construction is able to be probed by a laser beam directed at the optical scattering medium. In this case, the direction and polarization of the incident beam form the challenge, and the scattering pattern observed is taken as the PUF response.

However, this strong PUF construction is complex to implement, due to the fact that the measuring device is separate from the rest of the PUF device and is also difficult to integrate directly with semiconductor components. This is in addition to costs associated with the apparatus itself, and the lack of portability of the arrangement reducing its utility for everyday applications.

An electrical integrated strong PUF, known as the arbiter PUF (APUF), has since been proposed, which overcomes some of these issues. This construction utilises signal multiplexing and leverages runtime delays in electrical components. Many other strong PUF constructions have been proposed in parallel, although many lack practical suitability for widespread use, and many have associated weakness regarding security and potential attack vectors. For example, a highly problematic potential attack is the man-in-the-middle attack, whereby an attacker can intercept challenges submitted in the clear and spoof certified computations.

1.1.3. Controlled PUFs: a third class of PUFs, known as a controlled PUF (CPUF), improves on existing strong PUF constructions, but using them as a building block. These PUFs take a strong PUF and apply an additional control logic that restricts access to the PUF, which distinguishes them from non-controlled strong PUFs which otherwise may have unprotected challenge-response interfaces.

As shown in FIG. 4, the control logic 406 applied to the PUF, which is now part of a larger PUF device, may mediate access to the PUF 302 itself. This means that the control logic component 406 can restrict which challenges are presented to the PUF, as well as controlling how the subsequent responses are revealed to the user.

In CPUF construction, preferably the control logic component 406 should be embedded within or enveloped by the strong PUF component. According to one definition of a CPUF, a PUF is said to be controlled if can only be accessed via an algorithm that is physically linked to the PUF in an inseparable way (i.e. an attempt to circumvent the algorithm will lead to the destruction of the PUF). This embedding should make the probing of the control logic considerably more difficult.

This will establish a mutually-beneficial relationship between the PUF component and the control logic component, such that each mitigates a type of attack on the other. Namely, the encapsulation of the control logic within the PUF device itself protects the control logic from physical or invasive attacks because this would irreparably damage the PUF component and alter its responses, while the control logic naturally protects the PUF component from protocol-level attacks to extract CRPs or other information about the internal physical system underlying the PUF itself.

The applications of CPUFs are much the same as strong PUFs, but can be achieved in a more robust manner. In particular, certified computations and proof of execution can be achieved easily with the protocols outlined above.

An early example of a CPUF, which extended the design of the strong arbiter PUF (APUF), required a control logic to be intertwined with the APUF itself in the manner already described, such that the control logic and APUF mutually protect one another from different types of attack. The controlled APUF design generates a large set of CRPs from a single static response from an integrated circuit (IC) by incorporating the transient response of the system.

Another known example of a controlled PUF is a PUF-FSM construction. This comprises a strong PUF (an APUF in reality) in conjunction with a finite state machine (FSM) that acts as the control logic that restricts access to the challenge-response interface of the APUF component itself.

1.2. Discussion 1.2.1. Practicality: it is acknowledged in the literature that to produce strong PUFs that are both practical and lightweight, whilst also being integrable with standard complementary metal-oxide semiconductor (CMOS) components, is highly challenging. By contrast, weak PUFs such as the SRAM PUF are inexpensive to produce and can be trivially combined with integrated circuit architectures.

1.2.2. Attacks on PUFs: there are a number of different attacks that have been proposed and studied, where different attacks may target specific PUF constructions or classes. Some of the most widely-known attack types are listed as follows.

MITM attacks—these attacks target PUFs uncontrolled strong PUFs, where an adversary may intercept challenges made in the clear to impersonate or spoof the response of a PUF, particularly when used for certified computation.

Modelling attacks—these attacks have proven a vulnerability for many strong PUF constructions, such as the APUF.

Chosen challenge attacks—these attacks also affect strong PUFs and are partly the motivation for moving towards CPUF architectures.

There are also other issues with various PUF designs, such as lack of uniqueness in some cases, which have let to exploits that undermine the security of the PUF system in question.

1.2.3 Security models: the security models of PUF constructions tend to share some similarities, such as the assumption that the random process or manufacturing variations from which their CRPs arise is manufacturer-resistant and that it is intractable to characterise the physical system of the PUF by analytical means. However, there are also some differences in the security models for the three main PUF classes.

Weak PUFs—the security of a weak PUF relies on the assumption that its CRPs are kept secret, otherwise the device can be enumerated and impersonated. This means that a weak PUF can be used to provide a source of entropy and secure storage of that entropy for cryptographic operations, but the actual CRP response data itself is not revealed publicly in the process.

Strong PUFs—the security of a strong PUF is dependent on the fact that its CRP space tends to be exponential with the number of challenge bits, and thus the enumeration of the entire space is infeasible in a reasonable timeframe. This means that the CRP responses of a strong PUF can be revealed by the device, unlike in the case of weak PUFs.

Controlled PUFs—the security of a controlled PUF is determined by the combination of control logic, which protects from protocol level attacks, and the PUF itself, which protects from physical attacks.

Two properties of strong PUFs, which differentiate them from weak PUFs, are as follows. Firstly, a strong PUF has a large set of CRPs. This means that a strong PUF has a large challenge space OF, where a weak PUF has typically only one (or few) challenge(s) available to it. A strong PUF is moreover considered unpredictable with respect to any and all known CRPs. In other words, knowledge of an arbitrary number of CRPs gives no advantage in predicting the response of a new challenge.

Secondly, a strong PUF can have an unprotected challenge-response interface. The assumption is made that a given strong PUF does not require access-control logic to restrict access to the challenge-response interface. This means that any party with physical access to the PUF may apply challenges, and obtain responses, arbitrarily, without revealing any additional information about the PUF or its physical properties.

A controlled PUF has a protected challenge-response interface but also a large challenge-response space like a strong PUF.

2. EXPANDED PUF (ePUF)

The following discloses a system and method for expanding the challenge-response (CR) space of a PUF, by generating multiple secondary CR pairs from a given CR pair of the base PUF 302. This may be referred to herein as an "expanded PUF", or "ePUF". The idea could be used for example to expand the challenge-response space of a weak PUF with only one or a limited number of inherent CR pairs, without the complexity or impracticality of a typical strong PUF mechanism (such as an optical PUF requiring a laser, optical medium and sensor). However, in principle the disclosed techniques could be used more generally to expand the number of CR pairs of any base PUF, whether weak, strong, controlled or otherwise; or to transform a CR pair of any PUF for other purposes, such as obfuscation or re-usability.

Figure 5A:
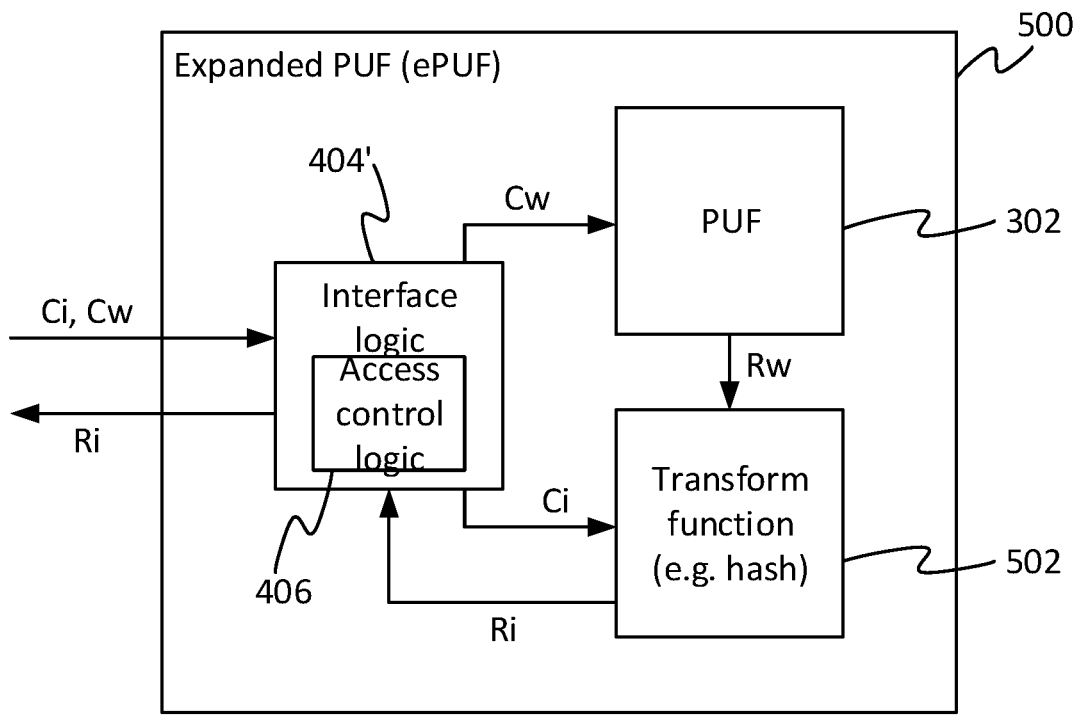
FIG. 5A is a schematic block diagram of an expanded PUF in accordance with embodiments disclosed herein.

FIG. 5A shows an expanded PUF (ePUF) 500 in accordance with embodiments disclosed herein. The ePUF 500 comprises a constituent base PUF 302, which could for example be a conventional weak PUF. The ePUF 500 further comprises a transform function 502, e.g. a hash function such as a cryptographic hash function (for instance SHA256, etc.). The ePUF 500 also comprises interface logic 404', which may be similar to the interface logic 404 discussed in relation to FIG. 4, but with additional interfacing functionality. The interface logic 404' and transform function 502 may be implemented in software, e.g. embedded firmware, which is stored in memory and arranged to run on a processor 402 (such as shown in FIG. 4, but running the additional functionality of the interface 404' and transform function 502). The memory on which the interface function 404' and transform logic 504 are stored may comprise one or more memory units employing one or more storage media (e.g. magnetic medium such as magnetic disk or tape, or an electronic medium such as ROM, EPROM, EEPORM, flash memory, SRAM, DRAM, fuse latches, etc.). The processor on which they are run may comprise one or more processing units (e.g. a general purpose processor such as a CPU, or an application specific or accelerator processor such as a GPU, DSP or crypto-processor). It is also not excluded that the interface logic 404' and/or transform function 502 could instead be implemented partially or wholly in dedicated hardware circuitry, or configurable or reconfigurable circuitry such as a PGA or FPGA.

The interface logic 404' is operatively coupled to the transform function 502 and optionally also to the base PUF 302. The base PUF 302 is operatively coupled to the transform function. The interface logic 404' is arranged to receive in input from, and provide an output to, a device of a submitting party 103S (not shown in FIG. 5A), e.g. a computer device, which could be the same device that the ePUF 500 is implemented on or an external device. The submitting party 103S could be a party using the ePUF 500 to perform a set up, to generate a set of challenges and expected responses to be linked to an identity for future reference; or could be a verifying party using the PUF at a later time to verify whether the generated response matches a previously-established expected response (or a challenge generating the response to provide to a verifying party). In another example application, the submitting party 103S could be using the ePUF 500 to produce a response for use as a key, or as a seed for generating a key. E.g. this could be used as a cryptographic key to encrypt or sign a message, e.g. to sign a part of a blockchain transaction.

The base PUF 302 is operable to generate a "primary" response Rw as an output, corresponding to receiving a "primary" challenge Cw as an input. The "primary" challenge-response (CR) pair herein refers to a base or "native" (i.e. inherent) CR pair of the base, constituent PUF 302. In some embodiments, the base PUF 302 may be capable of generating only a single base (i.e. primary) response Cw in response to a single challenge Cw, like a weak PUF.

In operation, the interface logic 404' receives challenge data (a challenge input) comprising at least a "secondary" challenge Ci from the device of the submitting party 103S. In addition, the primary (base) challenge Cw is input to the base PUF 302 in order to generate the primary (base) response Rw. In embodiments the submitting party 103S is required to include the base challenge Cw in the challenge data input to the ePUF 500, and the interface logic 404' routes this to the base PUF 302 in order to generate the primary response Rw. However, it is not excluded in other embodiments that the primary challenge Cw is input to the base PUF 302 from an internal source such as a memory, fuse latches or dedicated circuitry. Either way, the transform function 502 is arranged to receive as inputs: a) the secondary challenge Ci as received in the input challenge data from the submitting party, and b) the primary response Rw as generated by the base PUF 302. The transform function 502 is a function configured to map a combination of these, deterministically, onto a unique respective "secondary" response Ri corresponding to the particular combination of Ci and Rw input to the transform function 502. The secondary challenge response pairs may be referred to herein as "secondary" in the sense that they are layered on top of the primary (base) CR pair, being generated in part based on the primary response Rw. They could also be called the "expanded layer" or "supplementary" challenges and responses.

In embodiments, the transform function 502 comprises a hash function, e.g. a cryptographic hash function such as a SHA or DSA hash function. There are at least two different ways a hash function can be used. In the first, the transform function 502 comprises a hash of a preimage, wherein the preimage comprises a combination (e.g. concatenation) of the received secondary challenge Ci and the generated primary response. I.e. $Ri=H(Ci||Rw)$. Or more generally the preimage could comprise other elements as well, and/or another form of combination other than concatenation.

In the second, alternative approach, the transform function 502 comprises a hash of a preimage wherein the preimage comprises the received secondary challenge and the hash function is initialized with the generated primary response. I.e. $Ri=H(Ci)$ where H is initialized by Rw. Or again more generally the primage of H could comprise other elements as well, as long as it comprises at least Ci. Being initialized by Rw means that the mapping itself, of preimages to outputs defined by the hash function H, will depend on the Rw. Whereas in the previous case, the mapping of preimages to outputs caused by H does not depend on Rw, rather the preimage depends on Rw. I.e. in the previous paragraph, the preimage depends on Rw, and in this paragraph only H depends on Rw.

More generally still, in principle any function can be used as along as it deterministically and uniquely maps a combination of Ci and Rw onto a respective value of Ri, for each possible Ci in the domain to be accommodated by the ePUF 500.

The secondary challenge Ci can take any of a number of different possible values, and the transform function 502 will map them to respective values of the secondary response Ri based on the value of the particular received secondary challenge Ci and the value of the primary response Rw. Hence the ePUF 502 is capable of expanding the CR space of a given primary (base) CR pair to multiple secondary CR pairs. In embodiments Ci can take any arbitrary value within the range of values supported by the variable used (e.g. if it is a 32 bit integer it can take any of $2^{32}$ values).

Figure 5B:
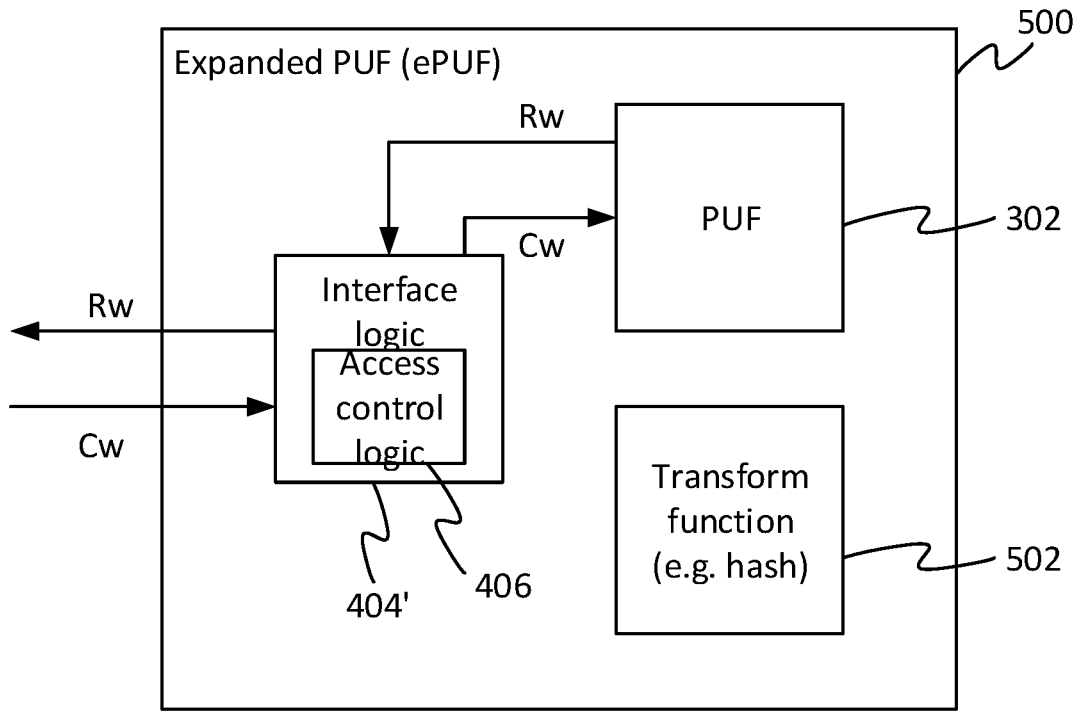
FIG. 5B is a schematic block diagram of the expanded PUF in a non-expanded mode of operation.

In some embodiments, the ePUF 500 may be capable of operating in an alternative mode of operation, as shown in FIG. 5B. In this case, the interface logic 404' detects that the input challenge data comprises only the primary challengee Cw. In response it routes the received value of Cw to the base PUF 302, and routes the resulting primary response Rw back to the device of the submitting party 103S. In other words in this embodiment, the ePUF 500 is also capable of operating in a "legacy" or "non-expanded" mode.

Optionally, depending on the application, the interface logic 404' may comprise access control logic 406 which restricts access to only a limited number of possible submitting parties 103S, such as by only granting access to a party that is able to present credentials (e.g. password, PIN or a biometric input) which it recognizes as being mapped to an authorized party. In this case the ePUF 500 could be considered as a form of CPUF. Alternatively the physical interface to the ePUF 500 could be legally or physically protected, such as by keeping the device comprising the ePUF 500 in a room or premises to which only a limited set of parties is permitted access, or keeping it in a locked box, cabinet or room. In this case the ePUF 500 could be considered like a kind of expanded weak PUF.

Alternatively or additionally to such physical restrictions on the interface to the PUF, access may also be restricted by restricting access to the primary challenge. E.g. the target party 103T ("Alice", discussed later) may be the only party who knows Cw.

As another alternative however, access to the interface logic 404' may not be restricted, e.g. any party may be free to query it via the Internet. In this case the ePUF 500 could be considered like a kind of strong PUF 502 created by expanding a weak base PUF mechanism. The arrangement shown in FIG. 5A provides a new hybrid class of PUF device referred to herein as an expanded PUF (ePUF), which may be used generally as a framework for a number of applications, such as presented later.

An ePUF may be defined as a physical device or system, as shown in FIG. 5A, comprising the following three modules in conjunction: a base PUF 302 such as an inherently weak PUF; a transform function 502 such as a cryptographic hash function; and an interface logic module 404'. As discussed, an ePUF 500 may be 'expanded' relative to a regular PUF 302 by introducing a transform function 404' such as a cryptographic hash function, because it increases the size of the unique challenge space $\Phi_F$ from $|\Phi_F| \sim 1$ for the base weak PUF 302 to $|\Phi_F| \gg 1$ that is bounded instead by the choice of hash function, rather than the physical system of the weak PUF.

The idea of realising a system that combines the large CRP space of a strong PUF with the practicability of a weak PUF, per se, has been explored previously. It is known to use multiple FPGA-based weak PUFs in combined operation to produce a system with the character of a strong PUF. The intention here is partly to 'expand' the CRP space of the base weak PUFs. However, the existing constructions of this nature are limited in practice. In the case of the FPGA design mentioned above, the system must be built on an FPGA and is still subject to a relatively low CRP space ($\sim 2^{10}$).

The ePUF design disclosed herein is designed to be extremely light-weight, in that it only requires the addition of an interface logic component 404' and a cryptographic hash function (or other such transform function) 502 to an existing weak PUF 302. For instance, if an SRAM PUF is chosen as a widely-used weak PUF 302, then the addition of the two remaining modules 404', 502 should not produce significant overhead, e.g. being implemented as a small algorithm in software (e.g. firmware) or a relatively simple piece of hardware circuitry. Moreover, the space of possible outputs of the ePUF 500 is expanded to the range of the chosen hash or transform function 502, which is considerably larger than the above. For instance, if the SHA-256 hash function is chosen, the space of possible outputs (and therefore CRPs) is increased to $2^{256}-1$ immediately, and there is no need to scale the hardware overhead farther than embedding the hash function module itself.

FIG. 5A shows the schematic design for an expanded PUF (ePUF) 500. The embodiments where a cryptographic hash function is used also mean that an ePUF 500 has the property that its CRPs are unpredictable, which is also the case for strong PUF systems.

The control logic element 406 of the ePUF device may also be generalised in this construction. The control logic 406 may be implemented simply as physical security, similar to an SRAM PUF, if this is appropriate to the application, for example.

Alternatively, the control logic module 406 may be implemented as a software control module similar to that used with CPUFs, where it is in fact embedded within the PUF device itself to provide the mutual security benefits of encapsulation discussed previously. However, a point here that differentiates the ePUF design from that of CPUFs in particular is that there is no strict requirement for the control logic to be implemented this way.

It need not necessarily be assumed that an invasive attack on the control module 406 necessarily alters the behaviour of the weak PUF component 302 in the ePUF design. Instead, the implementation of this element may be chosen on a case-by-case basis.

2.1. Challenges and Responses for ePUFs

The set of challenge-response pairs $(C, R) \in \Phi_F$ corresponding to an ePUF may be defined in the following way:

$$\Phi_F = \{(C_w, R_w), (C_1, R_1), (C_2, R_2), \ldots, (C_N, R_N)\},$$

$$F: C_i \to R_i, \forall i \in (1, N)$$

$$F_w: C_w \to R_w$$

where $(C_w, R_w)$ is a privileged CRP corresponding to the base challenge-and-response of the weak PUF 302 and where the map $F_w$ is defined by the unique physical properties of the weak PUF. The pair $(C_w, R_w)$ may be referred to as the base or primary pair of the ePUF herein. The map F conversely is defined by the cryptographic hash function chosen for the ePUF. FIGS. 5A-B show extracting responses from an ePUF 500 where (FIG. 5B) the challenge is only Cw and (FIG. 5A) the challenge also comprises Ci.

In some embodiments of an expanded PUF, all challenges $C_i$, $i \in \{1, 2, \ldots, N\}$ must be accompanied by the base challenge $C_w$, and the base response $R_w$ is incorporated in the process for generating all other responses Ri, as shown in FIG. 5A.

The process depicted in FIG. 5A for generating generic CRPs using an ePUF is designed to use the base challenge-response pair $(C_w, R_w)$ by expanding this base secret pairing by applying it to any other arbitrary challenge $C_i$. The algorithm used to generate CRPs from an ePUF may be tailored to a specific use, provided that the it makes use of the base pair $(C_w, R_w)$ in a deterministic way. A simple example of such an algorithm, denoted getResponse( ), can be written as follows.

getResponse( ):
Inputs: Challenge
1. Obtain challenge from user/client.
2. Check challenge==$C_w$?
   i. If yes:
      1. Probe weak PUF module with $C_w$ to obtain $R_w$
      2. Set Response←$R_w$ ii. If no:
   1. Separate Challenge into $C_w$ and $C_i$ components.
   2. Probe weak PUF module with $C_w$ to obtain $R_w$
   3. Send $C_i$ and $R_w$ to hash function module.
   4. Compute hash($C_i$, $R_w$, H)
   5. Set Response←hash ($C_i$, $R_w$, H)
3. Return Response
Outputs: Response The function hash($C_i$, $R_w$, H) is a generic function that is used to compute a hash digest, using the cryptographic hash function H. The function hash( ) may be implemented in a number of ways, such as by simply computing H ($C_i$||$R_w$) in a simple case, or it could be implemented by taxing computing H ($C_i$)$R_w$ where the value $R_w$ has been used as the initial vector of the hash function H. Either way, the output of hash( ) depends on both $C_i$ and $R_w$.

The diagrams in FIGS. 5A and 5B show that an ePUF 500 may be equipped with interface logic 404', optionally comprising a control logic module 406. In embodiments there are two possible paths to take in generating a response, where the path of FIG. 5B is used when the challenge is simply $C_w$, and the path of FIG. 5A is used when the challenge is a new value $C_i$ that is accompanied by $C_w$. This is deterministic.

The disclosed ePUF design may be used to provide any of the following advantages and/or others.

A large CRP space, defined by the domain and range of the chosen hash function.

Flexibility to separate control logic from the PUF itself.

The security primitives of a weak PUF.

This means that a user can use an ePUF device analogously to a CPUF device, but where the controlled access to the PUF includes both (I) securely storing the base CRP of the weak PUF ($C_w$, $R_w$), and (II) restricting physical access to the PUF device to the intended user only. In this model, the base pair ($C_w$, $R_w$) acts like a master key from which an extremely large number of other CRPs of the form ($C_i$, $R_i$) may be derived, and where $C_i$ may be submitted by an external or third party.

2.2. Applications of an ePUF

The possible applications (use cases) of an ePUF device can be classified broadly into at least two main categories:
1. Linking identity to activities or computational operations; and
2. Acting as a key-generator for cryptographic operations.

Application (1) is most commonly implemented by existing strong PUFs, and (2) is most commonly by existing weak PUFs. The fact that the ePUF construction combines the properties of each means the ePUF may be treated as equally suited to either application. In application (1), an advantage is that one may implement such applications far more easily in practice using an ePUF generally than most strong or controlled PUFs.

3. PUF DEVICE AS A KEY GENERATOR

The idea here is to use the response of a PUF as the seed (i.e. master entropy) of a wallet application such as an HD wallet used for blockchain transactions. In order to use the wallet, e.g. by regenerating private keys to sign transactions, the user will require two things:
1. knowledge of the correct challenge to elicit the response corresponding to the wallet entropy, and
2. physical control of the PUF device.

This idea can be used to create a new type of hardware wallet with a benefit that the 'key' or source of entropy never need be stored on-disk, unlike typical hardware wallets. In a normal hardware wallet, the key is stored on-device, usually air-gapped and not connected to the internet in any way. The owner then plugs in the device when they need to e.g. sign transactions and move funds. There is also usually a password or PIN that allows the user to authorise the use of the on-device stored keys. In the PUF-based hardware wallet, the usual PIN or password is replaced with a challenge, and a data key is replaced with the response of a physical system.

The PUF hardware wallet disclosed herein may mimic the same functionality of the existing hardware wallets, but without storing the master key on disk, or at least not in-the-clear. This protects it from physical attacks on the storage medium, which hardware wallets are still exposed to, to some degree. For instance, when the wallet is plugged in to a computer to perform a transaction, a PUF-based hardware wallet could be configured to be 'send-only' (transmit-only). This means the PUF device would not have to interface with a computer in the other direction. In embodiments the PUF device may additionally be able to perform ECDSA or other cryptographic operations on-device to create transactions ready for transmission.

Figure 6A:
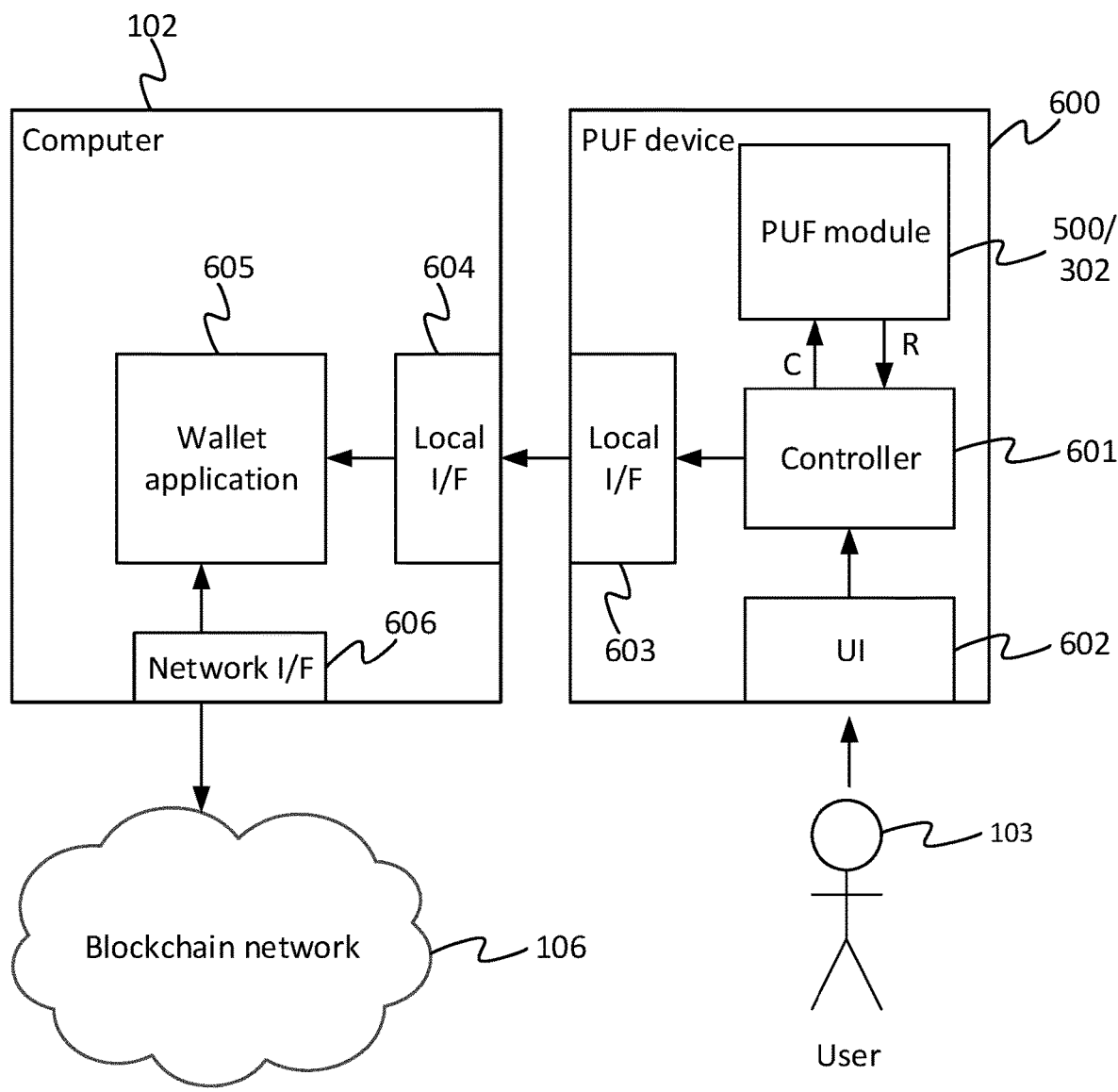
FIG. 6A is a schematic block diagram of a system comprising a PUF device for generating keys for use with a blockchain network.

FIG. 6A gives a schematic block diagram of an example system in accordance with one class of embodiments disclosed herein. The system comprises a PUF device 600 and a computer 102.

The PUF device 600 comprises a PUF module 302/500, a controller 601 and an inter-device interface 603 for connecting to the computer 102. Preferably these components of the PUF device 600 are all integrated into the same self-contained housing (i.e. casing), which may be sealed or locked to prevent tampering. The PUF device 600 may also comprise its own built-in user interface (UI) 602 incorporated into this housing. The UI 602 may comprise one or more user input means, e.g. a simple keypad or a dedicated-functionality touch screen. The PUF device 600 may take the form of a dedicated box or dongle, or other such peripheral appliance with the dedicated function of generating responses to instantiate wallet applications.

The computer 102 may comprise any suitable form comprising one or more computer terminals or units. E.g. it may take the form of a desktop, laptop, tablet, smart phone, or even a wearable computer such as a smart-watch or smart-glasses. The computer 102 may also take any form, e.g. as described later with respect to FIG. 1. In embodiments the computer 102 may be arranged within a larger system as described shortly with respect to FIG. 1. The computer 102 is installed with a wallet application 605, which may be similar to the wallet application 105 described later with respect to the general system of FIG. 1, but with additional specific functionality enabling it to be instantiated based on a response from the PUF device 600 as will be described shortly with respect to FIGS. 6A and 7. The computer 102 also comprises a network interface 606 for connecting, directly or vicariously via an intermediary, to the blockchain network 106 in order to send transactions 152 to be recorded on the blockchain 150 (again as will be described in more detail later). This connection may be via one or more underlying network infrastructures (e.g. the Internet) on which the blockchain network 106 is overlaid. E.g. the network interface 606 could comprise a Wi-Fi transceiver for connecting to a wireless router and then onwards to the Internet, or a mobile cellular transceiver for connecting to the Internet via a mobile cellular network, or a wired modem for connecting to the Internet via a phone line or optical fibre, etc.

The inter-device interface 603/604 is preferably a direct local interface, which herein means it does not connect via any network to which any third device could connect to at the same time. The local interface may be a wired, non-networked interface. E.g. in embodiments the inter-device interface 604 of the computer 102 may be a USB port or serial port and the corresponding inter-device interface 603 of the PUF device 603 may comprise a USB plug or serial port connector respectively. As another example, the inter-device interface 603 of the PUF device 600 may comprise a screen arranged to display the output response R in graphical form, such as a bar code or QR code, and the inter-device interface 604 of the computer 102 comprises a camera or scanner for reading the graphical form of the response R from the screen. The possibilities of a directly paired RF interface such as a Bluetooth connection, or even a networked connection such as via a WLAN, are not excluded, but these options may provide more opportunity for interception, depending on the scenario in which the PUF device 600 is deployed.

In embodiments the inter-device interface 603 of the PUF device is configured as a one-way interface (send only) which only allows data to be output from the device 600 and not input. In embodiments the UI 602 is the only means of inputting data into the PUF device 600 (short of disassembling the housing).

Within the PUF device 600, the controller 601 may take the form of a piece of code (software, e.g. firmware) stored on an embedded memory of the PUF device 600 and arranged to run on an embedded processor of the PUF device 601. The embedded memory may comprise one or more memory units, which may employ any one or more suitable memory media, e.g. an electronic memory such as a ROM, EPROM, EEPROM, flash memory, or static or dynamic RAM, etc.; or a magnetic medium such as a magnetic disk or tape. The embedded processor may comprise any one or more processing units taking any suitable form, e.g. a general purpose processor such as a CPU; or an application specific processor such as a GPU, DSP, cryptoprocessor, etc. In other embodiments, the controller 601 may even be implemented in the form of dedicated hardware circuitry, or configurable or reconfigurable circuitry such as a PGA or FPGA, or any combination of software and hardware.

In operation, the controller 601 receives an input challenge from a user 103. In embodiments this is entered through the built-in UI 602, e.g. the user enters a code or mnemonic phrase. For instance the UI 602 may comprise a numeric keypad and the user enters the challenge numerically, or the UI 602 may comprise a letter keypad through which the user enters the challenge in the form of a mnemonic phrase such as a BIP32 mnemonic phrase which the controller 601 converts to numeric form for input to the PUF module 500/302 (the option of a mnemonic phrase may be more appropriate if the PUF module takes a long form of input challenge such as a 256 bit challenge). In other embodiments it is not excluded that the input challenge could be provided from another device via the (or another) inter-device interface 603 of the PUF device 600. Either way, the controller 601 forwards this input challenge C to the PUF module 302/500, which in response to this, generates an output response R. The controller 602 then forwards this response to the wallet application 605 on the computer 102 via the respective inter-device interfaces 603, 604.

In embodiments, the PUF module within the PUF device 602 may consist of an expanded PUF (ePUF) 500 as described previously in relation to FIG. 5A. In this case, the input challenge C input to the PUF module 500 in FIG. 6A is a secondary challenge Ci, and the output response R is a secondary response Ri. The interface logic 404' supplies the primary challenge Cw to the actual PUF 302, and the secondary challenge Ci to the transform function 502. The transform function 502 takes this and the primary response Rw of the PUF module 302 as inputs, and maps the combination of these to the secondary response Ri. The interface logic 404' then outputs this secondary response Ri as the output response R of the PUF module 500. The wallet application 605 then uses the output response R to determine a seed (i.e. master or parent key) and instantiates itself based on this seed (discussed in more detail shortly).

In alternative embodiments however, the PUF module in the PUF device may simply be a plain PUF 302. In this case the input challenge C and output response R used to instantiate the wallet application 605 are simply the primary CR pair (i.e. the base or inherent CR pair) of the PUF 302.

Preferably the PUF module 500/302 provides the functionality of a strong PUF, i.e. one that is capable of mapping multiple challenge-response pairs, wherein the input challenge C and output response R used to instantiate the wallet application 605 form one of the multiple CR pairs. In the case of the ePUF 500, the PUF 302 itself may be a weak PUF but the ePUF 502 expands the weak functionality to enable multiple secondary-challenge response pairs to be generated from a single primary challenge response pair Cw, Rw. Thus the ePUF 500 overall acts like a strong PUF. In this case, the input challenge C and output response R used to instantiate the wallet application 605 are one of the secondary pairs. Alternatively however, in embodiments where the PUF module is just a PUF 302 on its own, this PUF 302 may be a strong PUF with multiple primary CR pairs, of which the pair used to instantiate the wallet application 605 are one such pair. The possibility of simply using a weak PUF is not excluded, but the advantage of a strong PUF is that if the user 103 loses the wallet, then any malicious party who finds it will not be able to determine which challenge needs to be used to generate the necessary response required to use the seed with which the wallet application 605 has been instantiated.

Whatever form the PUF module 302/500 takes, then in order to determine the seed used to instantiate the wallet application 605, in embodiments the output response R may simply be used as the seed verbatim (untransformed) if it is already of the same length (i.e. bit length—number of bits long) as the type of seed used by the wallet application. Alternatively a transformation may be applied to transform the output response R to the seed. E.g. if the seed length used by the wallet application 105 is different than the length of response R output by the PUF module 302/500, then the wallet application 605 may need to apply a transform which adapts the length of the response R, e.g. from 256 bits to 128 bits, or such like. Examples of such a transform would be a hash function (which outputs a value of a fixed length regardless of the length of the input), or a function which truncates or pads the output response R, or which takes every nth bit from it, etc.

By whatever means the seed is determined from the output response R (whether directly or via a transform), this seed may then be used as a master or parent key from which to derive at least one child key for signing one or more blockchain transactions 152 for recordal on a blockchain 150 (e.g. see FIG. 1, discussed in more detail later). Various child-key derivation functions for deriving child keys from a parent key are, in themselves, known in the art.

Before doing this, the wallet application 605 is first "instantiated" with the seed. This means storing, in part of the memory of the computer 102 in association with the wallet application 105, a piece of information which can be used at a later time to verify that a user has a right to use the seed (i.e. can use it to generate one or more child keys to cryptographically sign things such as transactions). This piece of information could be one of at least two things: either A) a one-way transform (e.g. hash) of the seed or of the response from which the seed is determined, or B) an encrypted version of the seed or response. The former (A) may be referred to as an "attestation" of the seed or response.

In the case of A), then at the time of generating the response R that was used to initially instantiate the wallet application 105, the user memorises or stores the corresponding input challenge C that was input to the PUF device 600 to generate the response R. Storing here could mean writing down on a piece of paper, or storing digitally, either on the computer 102 or another device (e.g. a separate personal device such as a phone or smart-watch). The user may memorise or store the challenge in the form of a convenient mnemonic such as a BIP32 mnemonic that can be mapped back to the numeric form of the challenge.

Later, when the user 103 wishes to sign a blockchain transaction 152, then/he she recalls or retrieves the code from his/her brain or paper or digital storage, and inputs it back into the PUF device 600 (e.g. via built-in UI 602) to re-generate the same response R that was generated at the time of instantiation. In some embodiments this may comprise mapping a phrase back to a numeric value and inputting the numeric value via the UI 602, or inputting the mnemonic phrase to the UI 602 which the controller 601 maps back to the numeric form of the challenge. By whatever means the challenge is reinput, this causes the controller 601 to output the response R again to the wallet application 105 on the computer 102, via the inter-device interfaces 603, 604. In response, the wallet application 605 applies the same transform (e.g. hash) that was used to generate the original attestation from the time of instantiation, and compares the result with the stored attestation. If they match, this demonstrates that the user is in possession of the same PUF device 600 and challenge C that was used at instantiation, and thus the user who is now present may be trusted. The wallet application 605 then allows the user to use the seed—newly determined from the recently generated instance of the response—to derive at least one child key, which the user can then use to sign one or more blockchain transactions 152 for recordal on a blockchain 150.

In the case of A), preferably neither the response R nor the seed is stored on the computer 102 in any form, nor indeed stored anywhere (it is deleted from the computer 102 following the generating of the attestation). Thus only a party in possession of the PUF device 600 and who can recall the original challenge C can use the seed.

In less-preferred variants, the user 103 could memorize, write down or store the response R or the seed, and input this to the wallet application 605 directly without having to re-generate it from the PUF device 600. However this would be less secure since if what the user has memorized, written down or stored is compromised, then possession of the PUF device 600 is not also required to generate keys.

In the case of B), instead of an attestation such as a hash, an encrypted version of the response or seed is stored on the computer 102 in part of its memory in association with the wallet application 605. The wallet application 105 also determines a password or code for enabling the response or seed to be decrypted, and supplies this to the user through a UI of the computer 102 (e.g. on screen or audibly). The user then memorises this password or code, or writes it down or stores it digitally (either on the computer or another device, e.g. a separate personal device like a phone or smart-watch). At a later time, when the user wants to use the seed to sign a transaction, the user inputs the password or passcode to the wallet application 605 through the UI of the computer 102. In some embodiments the password/code may be the decryption key itself, which the wallet application 605 uses to decrypt the response or seed. Alternatively the password or code may be a separate piece of data which the wallet application stores in association with the decryption key, and releases the decryption key if the user's supplied password/code matches the stored password/code (or an attestation of it). The wallet application 605 then decrypts the response or seed using the released key, and based on this, allows the user to use the seed to derive at least one child key for signing one or more blockchain transactions 152.

Optionally, the user 103 may also be required to supply the response or seed to the wallet application as well. They may do this by having memorized, written down or digitally stored the original challenge C, and re-input this to the PUF device to re-generate the response R. Alternatively in a less secure use case, they could have memorized, written down or digitally stored the response R or the seed. Either way, the wallet application 605 may check that the decrypted version of the response or seed matches the version that is now being supplied by the user 103 (e.g. based on the instance of the challenge that is now being input again to the PUF device 600).

Preferably the unencrypted (in-the-clear) version of the neither the response R nor the seed is stored on the computer 102, nor indeed anywhere (it is deleted from the computer 102 following the generating of the encrypted version).

Whichever approach is used for verifying the right to use the seed (e.g. A or B), then once the child key is derived and a blockchain transaction 152 signed with it, the wallet application 600 may transmit the signed transaction to be recorded on suitable a blockchain 150. The computer 102 further comprises a network interface 606 for this purpose, e.g. a Wi-Fi transceiver or a wired modem, etc. The computer 102 may transmit the signed transaction directly to one of the nodes 104 of the blockchain network 106 (see FIG. 1) in order for the node 104 to propagate the transaction throughout the network. Alternatively the computer 102 may transmit the transaction to a node 104 via one or more intermediate parties. E.g. the signed transaction could be a template transaction signed by Alice 103a, which still requires some parts to be completed by Bob 103b before it can be broadcast to the blockchain network 106. In this case Alice 103a may add her signature, send the signed template to Bob 103b to add his part(s), and then Bob forwards the competed version of the transaction onward to a node 104 of the blockchain network 106.

Figure 7:
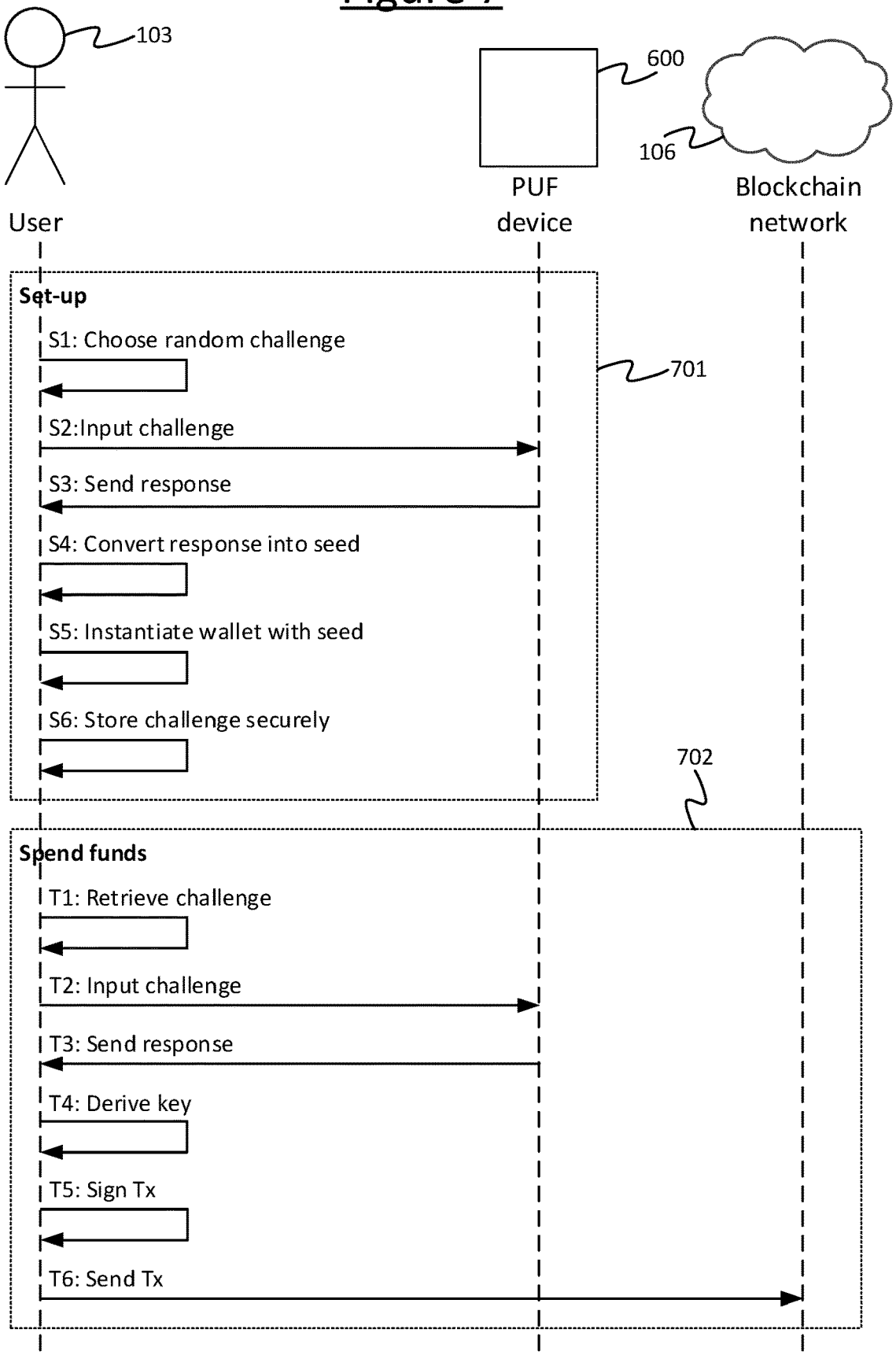
FIG. 7 is a signalling chart showing a first method according to embodiments disclosed herein.

FIG. 7 is a signalling chart showing an example of the method where wallet operations are external to the PUF device 600 as in FIG. 6A. Steps S1 to S6 are performed in a set-up phase 701, and steps T1 to T6 are performed in a subsequent spending phase 702.

At the start of the set-up phase 701, at step S1 the user 103 chooses a random challenge, e.g. in the form of a mnemonic phrase which maps to a number of a given bit length, such as 256 bits. At step S2 the user 103 inputs the challenge to the PUF device 600, e.g. via built-in UI 602. For instance the UI 602 may comprise a letter keypad and the user may enter his/her chosen phrase. The controller 601 of the PUF device 600 then supplies the input challenge into the PUF module 500/302. In embodiments the controller 601 may convert the challenge from mnemonic form to numerical form before inputting to the PUF module 500/302.

At step S3, in response to the input challenge, the PUF module 500/302 outputs a corresponding response, and the controller 601 forwards this to the wallet application 605 on the computer 102 via the respective inter-device interfaces 603, 604. At step S4 the response is converted into a seed, e.g. by generating a seed of a fixed seed length from a different length response. Alternatively the response could be used as the seed verbatim if of a suitable format for the key derivation algorithm being used.

At step S5 the wallet application 105 is instantiated with the determined seed, e.g. by storing an attestation such as a hash of the seed, or by storing an encrypted version of the seed. Preferably neither the seed nor the response itself is not stored, or at least not in-the-clear. At step S6 the user securely "stores" the challenge that was used to generate the response from which the seed was determined. In embodiments this may comprise the user memorizing the challenge mentally (e.g. in its mnemonic form), or writing it down manually, or storing it digitally (perhaps on a separate device than the computer 102, such as a separate phone or wearable device, or on a memory key that can be kept in a locked safe or storage box).

Later in the spending phase 702, then at step T1 the user 103 retrieves the stored challenge, e.g. by recalling it from memory, or reading it from the written or digital storage where it was kept. At step T2 the user inputs the challenge into the PUF device 600 again, in order to have it re-generate the response and output it to the wallet application 605 at step T3. This may be done in the same manner as described in relation to steps S2 to S3.

At step T4 the wallet application 605 determines the (candidate) seed from the newly supplied instance of the response, and checks that this is indeed the seed that was originally determined in the set-up phase 701. It may do this by applying the same transform (e.g. hash function) to the newly generated instance of the response as was used to generate the attestation which was stored at the set-up phase, and checking that the result matches the stored attestation. If so, the wallet application uses the seed to derive at least one child key using any suitable child key derivation function, depending on implementation.

Alternatively if the instantiation comprised storing an encrypted version of the seed rather than an attestation, then at step T4 the user 103 must enter a password or passcode, which could be the decryption key or a word or code that releases the decryption key. Either way, if the user 103 supplies the right password/code, then the wallet application 605 will decrypt the seed, and may compare it against the newly determined candidate seed. On condition that they match, the wallet application may then use the seed to derive at least one child key using any suitable child key derivation function, depending on implementation. As an additional condition, the wallet application 605 may also require the user to re-input the response or seed, which the user may do by recalling or looking up the original challenge C and re-inputting to the PUF device 600 to regenerate the response R.

At step T5, the wallet application 605 signs a blockchain transaction 152 with the derived child key. At step T6 the wallet application 605 transmits the signed transaction 152 to be recorded on the blockchain 150.

Figure 6B:
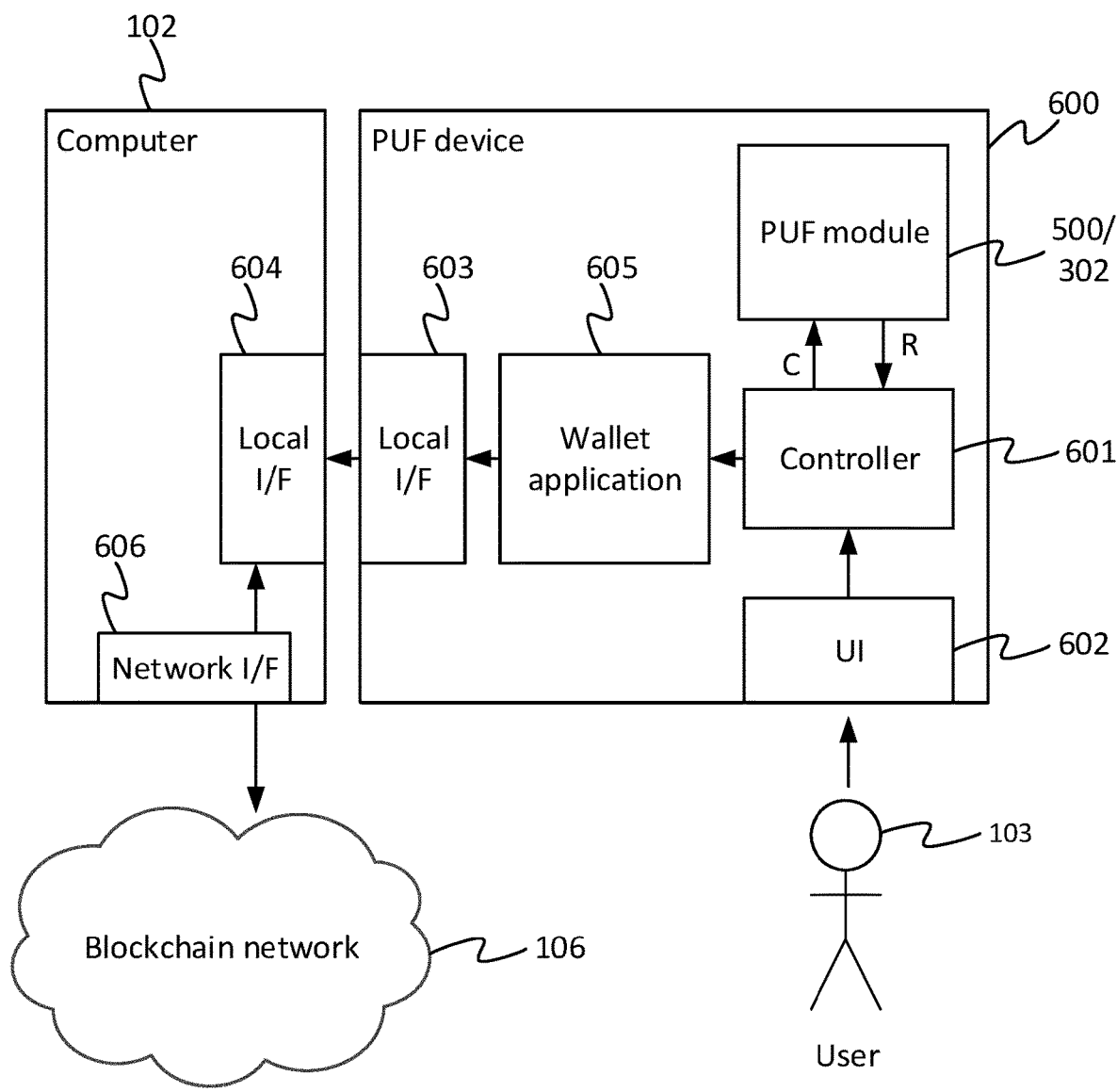
FIG. 6B is a schematic block diagram showing an alternative form of PUF device.

FIG. 6B shows a variant of the system of FIG. 6A in which the wallet application 605 is incorporated in the PUF device 600, within the same housing as the other components. It is stored in part of the embedded memory of the PUF device 600 and arranged to run on the embedded processor of the PUF device 600. Or alternatively the wallet application 605 could even be implemented in the form of dedicated hardware circuitry, or configurable or reconfigurable circuitry such as a PGA or FPGA, or any combination of hardware and software.

In the case of FIG. 6B, the system may be configured as already described in relation to FIG. 6A, except that when the controller 601 outputs the response R it outputs it directly to the wallet application 605 via an internal interface. Also, the stored transform of the seed or response—e.g. the attestation (e.g. hash) or the encrypted seed—is stored in part of the embedded memory of the PUF device 600, rather than on the computer 102. To get the wallet application 605 to sign the transaction, the user 103 may control the wallet application via the built-in UI 602 of the PUF device. When it comes to transmit the signed transaction to be recorded on the blockchain 150, then the wallet application may output it to the computer 102 via the respective inter-device interfaces 603, 604, in order for the computer 102 to forward the transaction onward toward the blockchain network 106 via the network interface 606 of the computer 102. Alternatively a network interface 606 could also be incorporated in the housing of the PUF device 600 so that the computer 102 is not required at all.

FIG. 8 is a signalling chart showing an example of the method where the wallet operations happen within the PUF device 600. The method comprises a set-up phase 801 comprising steps E1 to E5, and a spending phase 802 comprising steps P1 to P5.

At the beginning of the set-up phase 801, at step E1 the user 103 chooses a random challenge C, and at step E2 the user 103 inputs the challenge into the PUF device 600. These steps may be performed in the same way as steps S1 to S2. Step E2 causes the PUF device 600 to generate the response R, but this does not need to be sent to the computer 102, and instead it is made available to the embedded wallet application 105 internally within the PUF device 600. At step E3 the embedded wallet application 105 determines the seed from the response R, internally within the PUF device 600. At step E4 the wallet application 605 is instantiated by storing an attestation of the seed or response, or an encrypted version of the seed or response, internally within part of the embedded memory of the PUF device 600.

In the spending phase 802, then at step P1 the user 103 recalls, looks up or reads the challenge C. At step P2 the user 103 re-inputs the challenge into the PUF device 600, causing the PUF module 500/302 to re-generate the response R and supply it internally within the PUF device 600 to the embedded wallet application 605. The user also inputs the transaction that is to be signed (or this could be done later, after step P3). At step P3 the embedded wallet application derives a child key from the seed (assuming the user provided a challenge which generated the expected response at step P2). At step P4 the embedded wallet application 605 signs the transaction with the child key. Steps P3-P4 are still performed internally within the PUF device 600. At step P5 the embedded wallet application 605 transmits the signed transaction to be recorded on the blockchain 150. This transmission may either be via the computer 102, or directly from an embedded network interface of the PUF device 600.

In some embodiments, the key derivation algorithm is also a function of a nonce value. In this case, at step P2 the user 103 may also inputs a nonce value to the PUF device 600 along with the input challenge C. This enables deriving a unique one-time key based on the seed. This is not essential in all possible implementations, or where used, the nonce wouldn't necessarily need to be provided by the user (e.g. it could just be an incrementing counter on the device), but in some cases the user may specify the nonce to be used in key derivation.

In both the methods of FIGS. 6A/7 and 6B/8, preferably the user stores, writes down or remembers only the input challenge C that was used, rather than the corresponding response R, then uses the PUF device to re-generate the response again later when needed to derive an actual child key. In embodiments there may be nothing to stop the user writing down R and just re-inputting that to the wallet application instead—the wallet application doesn't know how R was derived or care how R may have been stored off-device. However the user is incentivised for security reasons not to store or write down R—i.e. to avoid an attacker compromising R without accessing the PUF.

4. EXAMPLE BLOCKCHAIN SYSTEM

The following describes an example of a wider blockchain system in which the system of FIG. 6A or 6B, and method of FIG. 7 or 8, may be deployed in certain embodiments of the present disclosure. Note that "Alice" and "Bob" are just arbitrary names for two parties, and Alice and Bob do not necessarily have the same roles in this section as in the preceding section or following sections, though in some scenarios they may do.

4.1. Example System Overview

Figure 1:
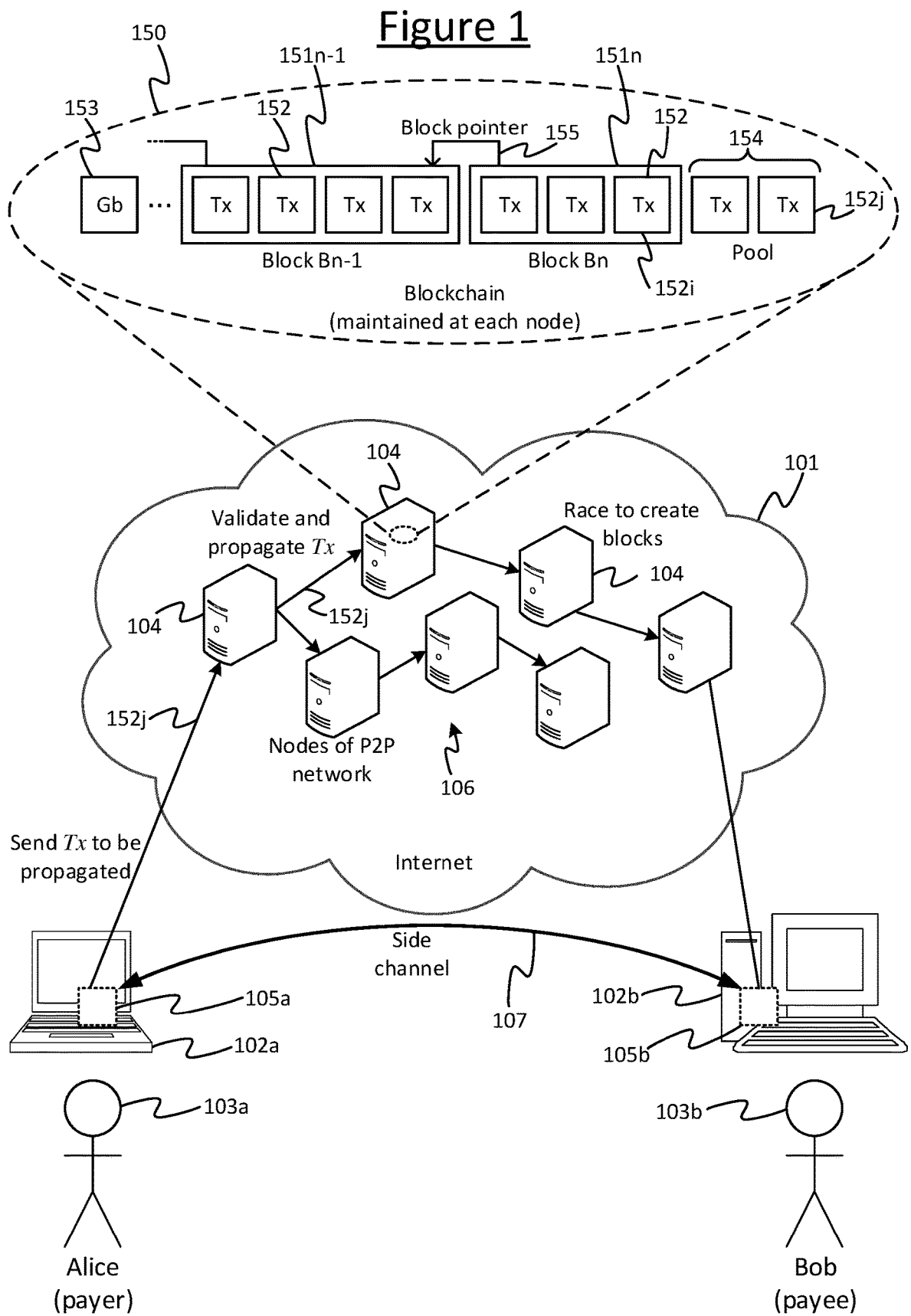
FIG. 1 is a schematic block diagram of a system for implementing a blockchain, FIG. 2 schematically illustrates some examples of transactions which may be recorded in a blockchain, FIG. 3 schematically illustrates a challenge and response of a PUF.

FIG. 1 shows an example system 100 for implementing a blockchain 150. The system 100 may comprise a packet-switched network 101, typically a wide-area internetwork such as the Internet. The packet-switched network 101 comprises a plurality of blockchain nodes 104 that may be arranged to form a peer-to-peer (P2P) network 106 within the packet-switched network 101. Whilst not illustrated, the blockchain nodes 104 may be arranged as a near-complete graph. Each blockchain node 104 is therefore highly connected to other blockchain nodes 104.

Each blockchain node 104 comprises computer equipment of a peer, with different ones of the nodes 104 belonging to different peers. Each blockchain node 104 comprises processing apparatus comprising one or more processors, e.g. one or more central processing units (CPUs), accelerator processors, application specific processors and/or field programmable gate arrays (FPGAs), and other equipment such as application specific integrated circuits (ASICs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of blockchain nodes 104 in the distributed or blockchain network 106. As mentioned above, maintaining a copy of the blockchain 150 does not necessarily mean storing the blockchain 150 in full. Instead, the blockchain 150 may be pruned of data so long as each blockchain node 150 stores the block header (discussed below) of each block 151. Each block 151 in the chain comprises one or more transactions 152, wherein a transaction in this context refers to a kind of data structure. The nature of the data structure will depend on the type of transaction protocol used as part of a transaction model or scheme. A given blockchain will use one particular transaction protocol throughout. In one common type of transaction protocol, the data structure of each transaction 152 comprises at least one input and at least one output. Each output specifies an amount representing a quantity of a digital asset as property, an example of which is a user 103 to whom the output is cryptographically locked (requiring a signature or other solution of that user in order to be unlocked and thereby redeemed or spent). Each input points back to the output of a preceding transaction 152, thereby linking the transactions.

Each block 151 also comprises a block pointer 155 pointing back to the previously created block 151 in the chain so as to define a sequential order to the blocks 151. Each transaction 152 (other than a coinbase transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

Each of the blockchain nodes 104 is configured to forward transactions 152 to other blockchain nodes 104, and thereby cause transactions 152 to be propagated throughout the network 106. Each blockchain node 104 is configured to create blocks 151 and to store a respective copy of the same blockchain 150 in their respective memory. Each blockchain node 104 also maintains an ordered set (or "pool") 154 of transactions 152 waiting to be incorporated into blocks 151. The ordered pool 154 is often referred to as a "mempool". This term herein is not intended to limit to any particular blockchain, protocol or model. It refers to the ordered set of transactions which a node 104 has accepted as valid and for which the node 104 is obliged not to accept any other transactions attempting to spend the same output.

In a given present transaction 152j, the (or each) input comprises a pointer referencing the output of a preceding transaction 152i in the sequence of transactions, specifying that this output is to be redeemed or "spent" in the present transaction 152j. In general, the preceding transaction could be any transaction in the ordered set 154 or any block 151. The preceding transaction 152i need not necessarily exist at the time the present transaction 152j is created or even sent to the network 106, though the preceding transaction 152i will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152i, 152j be created or sent out-of-order (see discussion below on orphan transactions). The preceding transaction 152i could equally be called the antecedent or predecessor transaction.

The input of the present transaction 152j also comprises the input authorisation, for example the signature of the user 103a to whom the output of the preceding transaction 152i is locked. In turn, the output of the present transaction 152j can be cryptographically locked to a new user or entity 103b. The present transaction 152j can thus transfer the amount defined in the input of the preceding transaction 152i to the new user or entity 103b as defined in the output of the present transaction 152j. In some cases a transaction 152 may have multiple outputs to split the input amount between multiple users or entities (one of whom could be the original user or entity 103a in order to give change). In some cases a transaction can also have multiple inputs to gather together the amounts from multiple outputs of one or more preceding transactions, and redistribute to one or more outputs of the current transaction.

According to an output-based transaction protocol such as bitcoin, when a party 103, such as an individual user or an organization, wishes to enact a new transaction 152j (either manually or by an automated process employed by the party), then the enacting party sends the new transaction from its computer terminal 102 to a recipient. The enacting party or the recipient will eventually send this transaction to one or more of the blockchain nodes 104 of the network 106 (which nowadays are typically servers or data centres, but could in principle be other user terminals). It is also not excluded that the party 103 enacting the new transaction 152j could send the transaction directly to one or more of the blockchain nodes 104 and, in some examples, not to the recipient. A blockchain node 104 that receives a transaction checks whether the transaction is valid according to a blockchain node protocol which is applied at each of the blockchain nodes 104. The blockchain node protocol typically requires the blockchain node 104 to check that a cryptographic signature in the new transaction 152j matches the expected signature, which depends on the previous transaction 152i in an ordered sequence of transactions 152. In such an output-based transaction protocol, this may comprise checking that the cryptographic signature or other authorisation of the party 103 included in the input of the new transaction 152j matches a condition defined in the output of the preceding transaction 152i which the new transaction assigns, wherein this condition typically comprises at least checking that the cryptographic signature or other authorisation in the input of the new transaction 152j unlocks the output of the previous transaction 152i to which the input of the new transaction is linked to. The condition may be at least partially defined by a script included in the output of the preceding transaction 152i. Alternatively it could simply be fixed by the blockchain node protocol alone, or it could be due to a combination of these. Either way, if the new transaction 152j is valid, the blockchain node 104 forwards it to one or more other blockchain nodes 104 in the blockchain network 106. These other blockchain nodes 104 apply the same test according to the same blockchain node protocol, and so forward the new transaction 152j on to one or more further nodes 104, and so forth. In this way the new transaction is propagated throughout the network of blockchain nodes 104.

In an output-based model, the definition of whether a given output (e.g. UTXO) is assigned (e.g. spent) is whether it has yet been validly redeemed by the input of another, onward transaction 152j according to the blockchain node protocol. Another condition for a transaction to be valid is that the output of the preceding transaction 152i which it attempts to redeem has not already been redeemed by another transaction. Again if not valid, the transaction 152j will not be propagated (unless flagged as invalid and propagated for alerting) or recorded in the blockchain 150. This guards against double-spending whereby the transactor tries to assign the output of the same transaction more than once. An account-based model on the other hand guards against double-spending by maintaining an account balance. Because again there is a defined order of transactions, the account balance has a single defined state at any one time.

In addition to validating transactions, blockchain nodes 104 also race to be the first to create blocks of transactions in a process commonly referred to as mining, which is supported by "proof-of-work". At a blockchain node 104, new transactions are added to an ordered pool 154 of valid transactions that have not yet appeared in a block 151 recorded on the blockchain 150. The blockchain nodes then race to assemble a new valid block 151 of transactions 152 from the ordered set of transactions 154 by attempting to solve a cryptographic puzzle. Typically this comprises searching for a "nonce" value such that when the nonce is concatenated with a representation of the ordered pool of pending transactions 154 and hashed, then the output of the hash meets a predetermined condition. E.g. the predetermined condition may be that the output of the hash has a certain predefined number of leading zeros. Note that this is just one particular type of proof-of-work puzzle, and other types are not excluded. A property of a hash function is that it has an unpredictable output with respect to its input. Therefore this search can only be performed by brute force, thus consuming a substantive amount of processing resource at each blockchain node 104 that is trying to solve the puzzle.

The first blockchain node 104 to solve the puzzle announces this to the network 106, providing the solution as proof which can then be easily checked by the other blockchain nodes 104 in the network (once given the solution to a hash it is straightforward to check that it causes the output of the hash to meet the condition). The first blockchain node 104 propagates a block to a threshold consensus of other nodes that accept the block and thus enforce the protocol rules. The ordered set of transactions 154 then becomes recorded as a new block 151 in the blockchain 150 by each of the blockchain nodes 104. A block pointer 155 is also assigned to the new block 151n pointing back to the previously created block 151n−1 in the chain. The significant amount of effort, for example in the form of hash, required to create a proof-of-work solution signals the intent of the first node 104 to follow the rules of the blockchain protocol. Such rules include not accepting a transaction as valid if it assigns the same output as a previously validated transaction, otherwise known as double-spending. Once created, the block 151 cannot be modified since it is recognized and maintained at each of the blockchain nodes 104 in the blockchain network 106. The block pointer 155 also imposes a sequential order to the blocks 151. Since the transactions 152 are recorded in the ordered blocks at each blockchain node 104 in a network 106, this therefore provides an immutable public ledger of the transactions.

Note that different blockchain nodes 104 racing to solve the puzzle at any given time may be doing so based on different snapshots of the pool of yet-to-be published transactions 154 at any given time, depending on when they started searching for a solution or the order in which the transactions were received. Whoever solves their respective puzzle first defines which transactions 152 are included in the next new block 151n and in which order, and the current pool 154 of unpublished transactions is updated. The blockchain nodes 104 then continue to race to create a block from the newly-defined ordered pool of unpublished transactions 154, and so forth. A protocol also exists for resolving any "fork" that may arise, which is where two blockchain nodes 104 solve their puzzle within a very short time of one another such that a conflicting view of the blockchain gets propagated between nodes 104. In short, whichever prong of the fork grows the longest becomes the definitive blockchain 150. Note this should not affect the users or agents of the network as the same transactions will appear in both forks.

According to the bitcoin blockchain (and most other blockchains) a node that successfully constructs a new block 104 is granted the ability to newly assign an additional, accepted amount of the digital asset in a new special kind of transaction which distributes an additional defined quantity of the digital asset (as opposed to an inter-agent, or inter-user transaction which transfers an amount of the digital asset from one agent or user to another). This special type of transaction is usually referred to as a "coinbase transaction", but may also be termed an "initiation transaction" or "generation transaction". It typically forms the first transaction of the new block 151n. The proof-of-work signals the intent of the node that constructs the new block to follow the protocol rules allowing this special transaction to be redeemed later. The blockchain protocol rules may require a maturity period, for example 100 blocks, before this special transaction may be redeemed. Often a regular (non-generation) transaction 152 will also specify an additional transaction fee in one of its outputs, to further reward the blockchain node 104 that created the block 151n in which that transaction was published. This fee is normally referred to as the "transaction fee", and is discussed blow.

Due to the resources involved in transaction validation and publication, typically at least each of the blockchain nodes 104 takes the form of a server comprising one or more physical server units, or even whole a data centre. However in principle any given blockchain node 104 could take the form of a user terminal or a group of user terminals networked together.

The memory of each blockchain node 104 stores software configured to run on the processing apparatus of the blockchain node 104 in order to perform its respective role or roles and handle transactions 152 in accordance with the blockchain node protocol. It will be understood that any action attributed herein to a blockchain node 104 may be performed by the software run on the processing apparatus of the respective computer equipment. The node software may be implemented in one or more applications at the application layer, or a lower layer such as the operating system layer or a protocol layer, or any combination of these.

Also connected to the network 101 is the computer equipment 102 of each of a plurality of parties 103 in the role of consuming users. These users may interact with the blockchain network 106 but do not participate in validating transactions or constructing blocks. Some of these users or agents 103 may act as senders and recipients in transactions. Other users may interact with the blockchain 150 without necessarily acting as senders or recipients. For instance, some parties may act as storage entities that store a copy of the blockchain 150 (e.g. having obtained a copy of the blockchain from a blockchain node 104).

Some or all of the parties 103 may be connected as part of a different network, e.g. a network overlaid on top of the blockchain network 106. Users of the blockchain network (often referred to as "clients") may be said to be part of a system that includes the blockchain network 106; however, these users are not blockchain nodes 104 as they do not perform the roles required of the blockchain nodes. Instead, each party 103 may interact with the blockchain network 106 and thereby utilize the blockchain 150 by connecting to (i.e. communicating with) a blockchain node 106. Two parties 103 and their respective equipment 102 are shown for illustrative purposes: a first party 103a and his/her respective computer equipment 102a, and a second party 103b and his/her respective computer equipment 102b. It will be understood that many more such parties 103 and their respective computer equipment 102 may be present and participating in the system 100, but for convenience they are not illustrated. Each party 103 may be an individual or an organization. Purely by way of illustration the first party 103a is referred to herein as Alice and the second party 103b is referred to as Bob, but it will be appreciated that this is not limiting and any reference herein to Alice or Bob may be replaced with "first party" and "second "party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective party 103 to create, authorise (for example sign) and send transactions 152 to one or more bitcoin nodes 104 to then be propagated throughout the network of blockchain nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment 102 is operatively coupled to at least one of the blockchain nodes 104 of the network 106. This enables the wallet function of the client 105 to send transactions 152 to the network 106. The client 105 is also able to contact blockchain nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. As set out above, each blockchain node 104 runs software configured to validate transactions 152 according to the blockchain node protocol, and to forward transactions 152 in order to propagate them throughout the blockchain network 106. The transaction protocol and the node protocol correspond to one another, and a given transaction protocol goes with a given node protocol, together implementing a given transaction model. The same transaction protocol is used for all transactions 152 in the blockchain 150. The same node protocol is used by all the nodes 104 in the network 106.

When a given party 103, say Alice, wishes to send a new transaction 152j to be included in the blockchain 150, then she formulates the new transaction in accordance with the relevant transaction protocol (using the wallet function in her client application 105). She then sends the transaction 152 from the client application 105 to one or more blockchain nodes 104 to which she is connected. E.g. this could be the blockchain node 104 that is best connected to Alice's computer 102. When any given blockchain node 104 receives a new transaction 152j, it handles it in accordance with the blockchain node protocol and its respective role. This comprises first checking whether the newly received transaction 152j meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152j passes the test for being deemed valid (i.e. on condition that it is "validated"), any blockchain node 104 that receives the transaction 152j will add the new validated transaction 152 to the ordered set of transactions 154 maintained at that blockchain node 104. Further, any blockchain node 104 that receives the transaction 152j will propagate the validated transaction 152 onward to one or more other blockchain nodes 104 in the network 106. Since each blockchain node 104 applies the same protocol, then assuming the transaction 152j is valid, this means it will soon be propagated throughout the whole network 106.

Once admitted to the ordered pool of pending transactions 154 maintained at a given blockchain node 104, that blockchain node 104 will start competing to solve the proof-of-work puzzle on the latest version of their respective pool of 154 including the new transaction 152 (recall that other blockchain nodes 104 may be trying to solve the puzzle based on a different pool of transactions 154, but whoever gets there first will define the set of transactions that are included in the latest block 151. Eventually a blockchain node 104 will solve the puzzle for a part of the ordered pool 154 which includes Alice's transaction 152j). Once the proof-of-work has been done for the pool 154 including the new transaction 152j, it immutably becomes part of one of the blocks 151 in the blockchain 150. Each transaction 152 comprises a pointer back to an earlier transaction, so the order of the transactions is also immutably recorded.

Different blockchain nodes 104 may receive different instances of a given transaction first and therefore have conflicting views of which instance is 'valid' before one instance is published in a new block 151, at which point all blockchain nodes 104 agree that the published instance is the only valid instance. If a blockchain node 104 accepts one instance as valid, and then discovers that a second instance has been recorded in the blockchain 150 then that blockchain node 104 must accept this and will discard (i.e. treat as invalid) the instance which it had initially accepted (i.e. the one that has not been published in a block 151).

An alternative type of transaction protocol operated by some blockchain networks may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored, by the nodes of that network, separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

4.2. UTXO-Based Model

Figure 2:
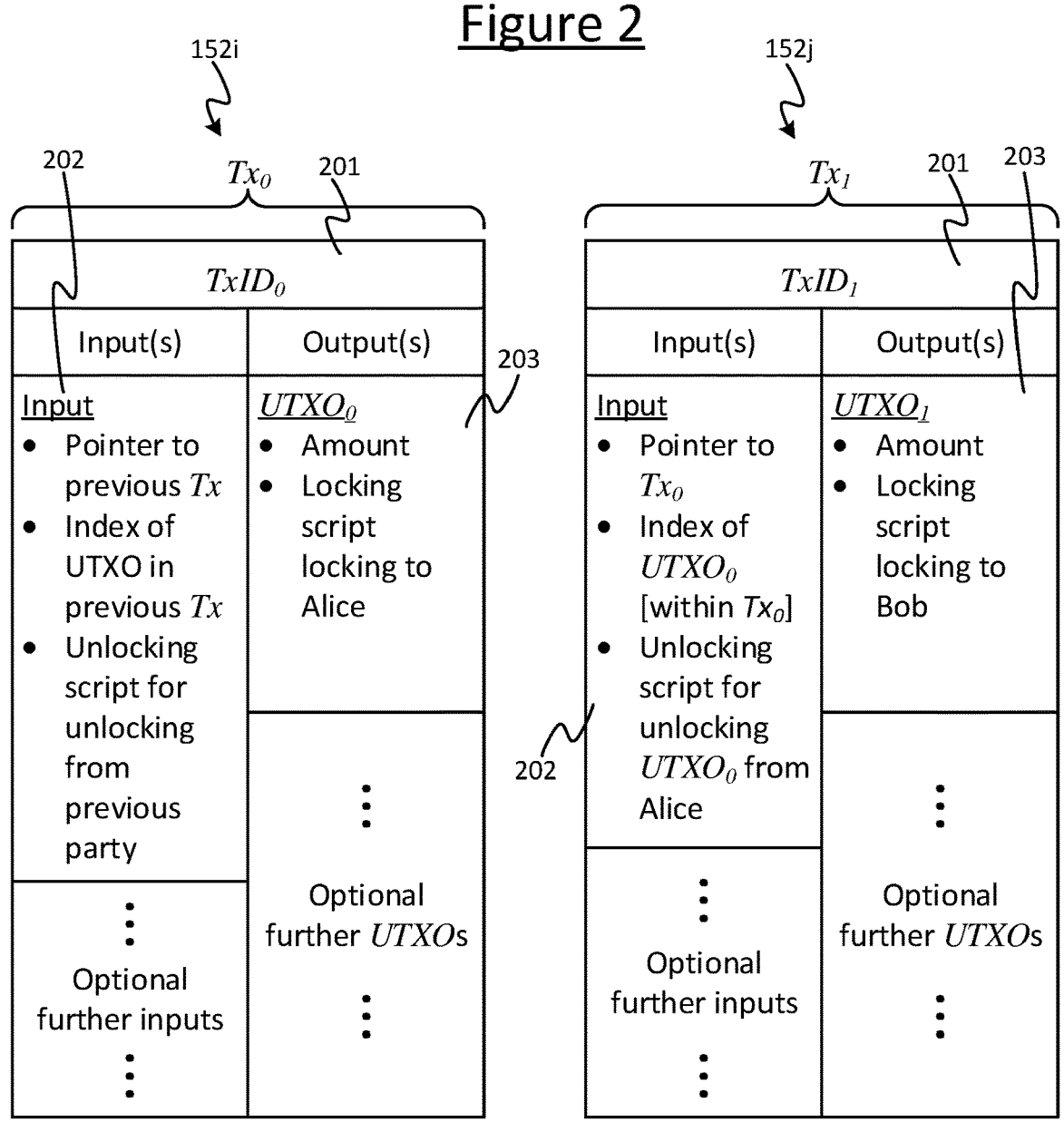

FIG. 2 illustrates an example transaction protocol. This is an example of a UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this is not limiting to all possible embodiments. Note that while the example UTXO-based protocol is described with reference to bitcoin, it may equally be implemented on other example blockchain networks.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO includes a value specifying an amount of a digital asset. This represents a set number of tokens on the distributed ledger. The UTXO may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the nodes 104.

Say Alice 103a wishes to create a transaction 152j transferring an amount of the digital asset in question to Bob 103b. In FIG. 2 Alice's new transaction 152j is labelled "$Tx_1$". It takes an amount of the digital asset that is locked to Alice in the output 203 of a preceding transaction 152i in the sequence, and transfers at least some of this to Bob. The preceding transaction 152i is labelled "$Tx_0$" in FIG. 2. $Tx_0$ and $Tx_1$ are just arbitrary labels. They do not necessarily mean that $Tx_0$ is the first transaction in the blockchain 151, nor that $Tx_1$ is the immediate next transaction in the pool 154. $Tx_1$ could point back to any preceding (i.e. antecedent) transaction that still has an unspent output 203 locked to Alice.

The preceding transaction $Tx_0$ may already have been validated and included in a block 151 of the blockchain 150 at the time when Alice creates her new transaction $Tx_1$, or at least by the time she sends it to the network 106. It may already have been included in one of the blocks 151 at that time, or it may be still waiting in the ordered set 154 in which case it will soon be included in a new block 151. Alternatively $Tx_0$ and $Tx_1$ could be created and sent to the network 106 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given blockchain node 104. Nevertheless, a subsequent transaction (the descendent transaction or "child") which points to a preceding transaction (the antecedent transaction or "parent") will not be validated until and unless the parent transaction is validated. A child that arrives at a blockchain node 104 before its parent is considered an orphan. It may be discarded or buffered for a certain time to wait for the parent, depending on the node protocol and/or node behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S) which is used by the blockchain network. The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains a representation (i.e. a hash) of the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). The data (or "message") that needs to be signed by Alice to provide a valid signature may be defined by the locking script, or by the node protocol, or by a combination of these.

When the new transaction $Tx_1$ arrives at a blockchain node 104, the node applies the node protocol. This comprises running the locking script and unlocking script together to check whether the unlocking script meets the condition defined in the locking script (where this condition may comprise one or more criteria). In embodiments this involves concatenating the two scripts:

$$<Sig\ P_A><P_A>||[Checksig\ P_A]$$

where "||" represents a concatenation and "< . . . >" means place the data on the stack, and "[ . . . ]" is a function comprised by the locking script (in this example a stack-based language). Equivalently the scripts may be run one after the other, with a common stack, rather than concatenating the scripts. Either way, when run together, the scripts use the public key $P_A$ of Alice, as included in the locking script in the output of $Tx_0$, to authenticate that the unlocking script in the input of $Tx_1$ contains the signature of Alice signing the expected portion of data. The expected portion of data itself (the "message") also needs to be included in order to perform this authentication. In embodiments the signed data comprises the whole of $Tx_1$ (so a separate element does not need to be included specifying the signed portion of data in the clear, as it is already inherently present).

The details of authentication by public-private cryptography will be familiar to a person skilled in the art. Basically, if Alice has signed a message using her private key, then given Alice's public key and the message in the clear, another entity such as a node 104 is able to authenticate that the message must have been signed by Alice. Signing typically comprises hashing the message, signing the hash, and tagging this onto the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in $Tx_1$ meets the one or more conditions specified in the locking script of $Tx_0$ (so in the example shown, if Alice's signature is provided in $Tx_1$ and authenticated), then the blockchain node 104 deems $Tx_1$ valid. This means that the blockchain node 104 will add $Tx_1$ to the ordered pool of pending transactions 154. The blockchain node 104 will also forward the transaction $Tx_1$ to one or more other blockchain nodes 104 in the network 106, so that it will be propagated throughout the network 106. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the blockchain node 104 also needs to check whether the referenced UTXO in the preceding transaction $Tx_0$ is already spent (i.e. whether it has already formed a valid input to another valid transaction). This is one reason why it is important for the blockchain 150 to impose a defined order on the transactions 152. In practice a given blockchain node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor included in a block 151.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the bitcoin node 104 that successfully includes her transaction 104 in a block 151. If Alice does not include such a fee, $Tx_0$ may be rejected by the blockchain nodes 104, and hence although technically valid, may not be propagated and included in the blockchain 150 (the node protocol does not force blockchain nodes 104 to accept transactions 152 if they don't want). In some protocols, the transaction fee does not require its own separate output 203 (i.e. does not need a separate UTXO). Instead any difference between the total amount pointed to by the input(s) 202 and the total amount of specified in the output(s) 203 of a given transaction 152 is automatically given to the blockchain node 104 publishing the transaction. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference may be assigned by the node 104 that wins the proof-of-work race to create the block containing $UTXO_1$. Alternatively or additionally however, it is not necessarily excluded that a transaction fee could be specified explicitly in its own one of the UTXOs 203 of the transaction 152.

Alice and Bob's digital assets consist of the UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the bitcoin nodes 104.

Note that the script code is often represented schematically (i.e. not using the exact language). For example, one may use operation codes (opcodes) to represent a particular function. "OP_..." refers to a particular opcode of the Script language. As an example, OP_RETURN is an opcode of the Script language that when preceded by OP_FALSE at the beginning of a locking script creates an unspendable output of a transaction that can store data within the transaction, and thereby record the data immutably in the blockchain 150. E.g. the data could comprise a document which it is desired to store in the blockchain.

Typically an input of a transaction contains a digital signature corresponding to a public key $P_A$. In embodiments this is based on the ECDSA using the elliptic curve secp256k1. A digital signature signs a particular piece of data. In some embodiments, for a given transaction the signature will sign part of the transaction input, and some or all of the transaction outputs. The particular parts of the outputs it signs depends on the SIGHASH flag. The SIGHASH flag is usually a 4-byte code included at the end of a signature to select which outputs are signed (and thus fixed at the time of signing).

The locking script is sometimes called "scriptPubKey" referring to the fact that it typically comprises the public key of the party to whom the respective transaction is locked. The unlocking script is sometimes called "scriptSig" referring to the fact that it typically supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

4.3. Side Channel

As shown in FIG. 1, the client application on each of Alice and Bob's computer equipment 102a, 120b, respectively, may comprise additional communication functionality. This additional functionality enables Alice 103a to establish a separate side channel 107 with Bob 103b (at the instigation of either party or a third party). The side channel 107 enables exchange of data separately from the blockchain network. Such communication is sometimes referred to as "off-chain" communication. For instance this may be used to exchange a transaction 152 between Alice and Bob without the transaction (yet) being registered onto the blockchain network 106 or making its way onto the chain 150, until one of the parties chooses to broadcast it to the network 106. Sharing a transaction in this way is sometimes referred to as sharing a "transaction template". A transaction template may lack one or more inputs and/or outputs that are required in order to form a complete transaction. Alternatively or additionally, the side channel 107 may be used to exchange any other transaction related data, such as keys, negotiated amounts or terms, data content, etc.

The side channel 107 may be established via the same packet-switched network 101 as the blockchain network 106. Alternatively or additionally, the side channel 301 may be established via a different network such as a mobile cellular network, or a local area network such as a local wireless network, or even a direct wired or wireless link between Alice and Bob's devices 102a, 102b. Generally, the side channel 107 as referred to anywhere herein may comprise any one or more links via one or more networking technologies or communication media for exchanging data "off-chain", i.e. separately from the blockchain network 106. Where more than one link is used, then the bundle or collection of off-chain links as a whole may be referred to as the side channel 107. Note therefore that if it is said that Alice and Bob exchange certain pieces of information or data, or such like, over the side channel 107, then this does not necessarily imply all these pieces of data have to be send over exactly the same link or even the same type of network.

The side channel 107 may comprise a secure channel employing known secure communications techniques to enable secure, private off-chain communication between parties such as Alice and Bob. For example the secure channel may be based on a shared secret shared between the parties communicating over the secure channel. Such a channel may be used, for example, to communicate between the verifying party 103V and the target party 103T, such as to enable the verifying party 103V to submit a challenge to a PUF 302/500 held by the target party, and to receive back the corresponding response.

5. CONCLUSION

Other variants or use cases of the disclosed techniques may become apparent to the person skilled in the art once given the disclosure herein. The scope of the disclosure is not limited by the described embodiments but only by the accompanying claims.

For instance, some embodiments above have been described in terms of a bitcoin network 106, bitcoin blockchain 150 and bitcoin nodes 104. However it will be appreciated that the bitcoin blockchain is one particular example of a blockchain 150 and the above description may apply generally to any blockchain. That is, the present invention is in by no way limited to the bitcoin blockchain. More generally, any reference above to bitcoin network 106, bitcoin blockchain 150 and bitcoin nodes 104 may be replaced with reference to a blockchain network 106, blockchain 150 and blockchain node 104 respectively. The blockchain, blockchain network and/or blockchain nodes may share some or all of the described properties of the bitcoin blockchain 150, bitcoin network 106 and bitcoin nodes 104 as described above.

In preferred embodiments of the invention, the blockchain network 106 is the bitcoin network and bitcoin nodes 104 perform at least all of the described functions of creating, publishing, propagating and storing blocks 151 of the blockchain 150. It is not excluded that there may be other network entities (or network elements) that only perform one or some but not all of these functions. That is, a network entity may perform the function of propagating and/or storing blocks without creating and publishing blocks (recall that these entities are not considered nodes of the preferred bitcoin network 106).

In other embodiments of the invention, the blockchain network 106 may not be the bitcoin network. In these embodiments, it is not excluded that a node may perform at least one or some but not all of the functions of creating, publishing, propagating and storing blocks 151 of the blockchain 150. For instance, on those other blockchain networks a "node" may be used to refer to a network entity that is configured to create and publish blocks 151 but not store and/or propagate those blocks 151 to other nodes.

Even more generally, any reference to the term "bitcoin node" 104 above may be replaced with the term "network entity" or "network element", wherein such an entity/element is configured to perform some or all of the roles of creating, publishing, propagating and storing blocks. The functions of such a network entity/element may be implemented in hardware in the same way described above with reference to a blockchain node 104.

It will be appreciated that the above embodiments have been described by way of example only. More generally there may be provided a method, apparatus or program in accordance with any one or more of the following Statements.

Statement 1. A method comprising: inputting an input challenge to a PUF device which includes a PUF module comprising a physically unclonable function, PUF, wherein the PUF device is configured to generate a corresponding output response based on the input challenge and the PUF in response to the inputting of the input challenge; instantiating a wallet application to use a seed determined from the output response as generated by the PUF device in response to said inputting of the input challenge, wherein said instantiating comprises storing a transform of the seed or output response in association with the wallet application; at a later time, a user supplying the wallet application with information demonstrating a right to use the seed, wherein the wallet application is configured so as in response to verify said information based on said transform as stored in association with the wallet application, and on condition that the information is thereby verified, to derive at least one child key from the seed; and signing a blockchain transaction using the child key as derived by the wallet application in response to the verification, and transmitting the signed blockchain transaction to be recorded on a blockchain.

Statement 2. The method of Statement 1, wherein said information comprises a re-generated instance of the output response generated by the user re-inputting an instance of the input challenge to the PUF device.

Statement 3. The method of Statement 1 or 2, wherein the seed is equal to the output challenge.

Statement 4. The method of Statement 1 or 2, wherein the seed is derived from the output challenge.

Statement 5. The method of Statement 4, wherein said derivation of the seed from the output challenge comprises: deriving a seed of a fixed seed length required by the wallet application wherein the output response is of a different length.

Statement 6. The method of any preceding Statement, wherein said transform comprises an attestation comprising a hash or other one-way transformation of the seed or output response, and said information comprises a re-submitted instance of the seed or output response, said verification by the wallet application comprising either: i) verifying that the same transform applied to the re-submitted instance of the seed or output response equals the stored attestation of the seed or output response respectively, or ii) re-determining the seed from the re-submitted instance of the output response and verifying that the same transform applied to the re-determined seed equals the stored attestation of the seed.

Statement 7. The method of Statement 6, wherein said re-submitted instance of the seed or output response is a re-generated instance generated by the user re-inputting an instance of the input challenge into the PUF device.

Statement 8. The method of any of Statements 1 to 4, wherein said transform comprises an encrypted version of the seed or output response, and said information comprises a password or passcode, said verification by the wallet application comprising: verifying the supplied password or passcode and decrypting the encrypted version of the seed or output response on condition thereof.

Statement 9. The method of Statement 8, wherein the password or passcode comprises a decryption key and said verifying and decrypting comprise using the supplied decryption key to decrypt the encrypted version of the seed or output response.

Statement 10. The method of Statement 8, wherein the wallet application stores a decryption key in association with the wallet application, the password or passcode comprising a different piece of information, wherein said decryption comprises releasing the decryption key to decrypt the encrypted version of the seed or output response on condition of verifying the supplied password or passcode.

Statement 11. The method of any of Statements 8 to 10, wherein said information further comprises a re-submitted instance of the seed or output response, and said verification by the wallet application further comprises verifying that the decrypted seed or response is equal to the re-submitted instance of the seed or output response, respectively.

Statement 12. The method of Statement 11, wherein said re-submitted instance of the seed or output response is a re-generated instance generated by the user re-inputting an instance of the input challenge into the PUF device.

Statement 13. The method of any preceding Statement, wherein said PUF module comprises an expanded PUF device comprising the PUF, interface logic and a deterministic transform function, said input challenge being a secondary challenge and said output response being a secondary response; wherein the interface logic is arranged to input a primary challenge to the PUF to cause the PUF to generate a primary response, and the transform function is arranged to generate the secondary response as a function of the secondary challenge and primary response, the interface being arranged to return the secondary response as the output response of the PUF device.

Statement 14. The method of any of Statement 1 to 12, wherein said PUF module consists of just a PUF, the input challenge and output response being a primary challenge and response of the PUF respectively.

Statement 15. The method of Statement 13 or 14, wherein the PUF module has a plurality of different possible challenge-response pairs, said input challenge and output response being one of said plurality of challenge-response pairs.

Statement 16. The method of any preceding Statement, wherein the PUF device including the PUF is housed within a self-contained housing.

Statement 17. The method of Statement 16, wherein said inputting of the input challenge is performed through a built-in user interface incorporated in the housing of the PUF device.

Statement 18. The method of Statement 16 or 17, wherein the PUF device comprises no interface for receiving data other than said user interface.

Statement 19. The method of Statement 16 or 17, wherein said built-in user interface comprises a keypad.

Statement 20. The method of any of Statement 16 to 19, wherein the wallet application is installed and run on a computer housed in a separate housing than the PUF device, and said transform of the seed is stored on said computer; wherein the PUF device comprises an inter-device interface for communicating with the computer in order to output the output response to the wallet application on the computer in order for the wallet application to perform said determination of the seed; and wherein a user inputs said information via a user interface of the computer, and the blockchain transaction is signed on the computer and transmitted from said computer to be recorded on the blockchain.

Statement 21. The method of Statement 20, wherein said inter-device interface is a direct local interface.

Statement 22. The method of Statement 19 or 21, wherein said interface comprises one of:
  a USB connector for connecting to the computer via a USB port of the computer; or
  a screen arranged to display the output response in graphical form, to be read by a camera or scanner of the computer.

Statement 23. The method of any of Statement 16 to 19, wherein the wallet application is incorporated within the PUF device, and said transform of the seed is stored within PUF the device; wherein said inputting of the input challenge is performed through a built-in user interface incorporated in the housing of the PUF device, and a user enters said information via the built in user interface of the PUF device; and wherein the blockchain transaction is signed on the PUF device and transmitted from the PUF device to be recorded on the blockchain Statement 24. The method of Statement 23, wherein the blockchain transaction is transmitted via a local interface of the PUF device to a separate computer, and then onward via a network interface of the computer.

Statement 25. The method of Statement 23, wherein the blockchain transaction is transmitted directly via a network interface incorporated in the PUF device.

Statement 26. The method of any of Statement 20 to 25, wherein the output response is not stored on the computer, or at least not in-the-clear.

Statement 27. The method of any of Statements 16 to 26, wherein the housing of the PUF device is locked or sealed.

Statement 28. The method of any preceding Statement, wherein the output response is not stored anywhere, or at least not in-the-clear.

Statement 29. The method of any preceding Statement, wherein the input challenge is input in the form of a BIP32 mnemonic phase or other mnemonic phrase mapped to a numerical value of the input challenge, the numerical value being used by the PUF device to generate the output response.

Statement 30. A PUF device comprising, incorporated within a same housing: a built-in user interface for inputting an input challenge; a physically unclonable function, PUF, wherein the PUF device is configured to generate a corresponding output response based on the input challenge and the PUF in response to the inputting of the input challenge; embedded memory comprising one or more memory units; and an embedded processor arranged to run a blockchain wallet application stored in part of said embedded memory, wherein the blockchain wallet application is arranged to be instantiated to use a seed determined from the output challenge as generated by the PUF device, wherein said instantiating comprises storing a transform of the seed or output response in a part of the embedded memory; wherein the user interface is further operable to receive, from a user, information demonstrating a right to use the seed; wherein the wallet application is configured so as in response to verify said information based on said transform as stored in association with the wallet application, and on condition that the information is thereby verified, to derive at least one child key from the seed; wherein the wallet application is operable to sign a blockchain transaction using the child key as derived by the wallet application in response to the verification; and wherein the PUF device further comprises a data interface transmitting the signed blockchain transaction to be recorded on a blockchain.

The invention claimed is:

1. A method comprising:

inputting an input challenge to a PUF device which includes a PUF module comprising a physically unclonable function, PUF, wherein the PUF device is configured to generate a corresponding output response based on the input challenge and the PUF in response to the inputting of the input challenge;

instantiating a wallet application to use a seed determined from the output response as generated by the PUF device in response to said inputting of the input challenge, wherein said instantiating comprises storing a transform of the seed or output response in association with the wallet application;

at a later time, a user supplying the wallet application with information demonstrating a right to use the seed, wherein the wallet application is configured so as in response to verifying said information based on said transform as stored in association with the wallet application, and on condition that the information is thereby verified, to derive at least one child key from the seed; and signing a blockchain transaction using the child key as derived by the wallet application in response to the verification, and transmitting the signed blockchain transaction to be recorded on a blockchain.

2. The method of claim 1, wherein said information comprises a re-generated instance of the output response generated by the user re-inputting an instance of the input challenge to the PUF device.

3. The method of claim 1, wherein the seed is equal to the output challenge.

4. The method of claim 1, wherein the seed is derived from the output challenge.

5. The method of claim 4, wherein said derivation of the seed from the output challenge comprises: deriving a seed of a fixed seed length required by the wallet application wherein the output response is of a different length.

6. The method of claim 1, wherein said transform comprises an attestation comprising a hash or other one-way transformation of the seed or output response, and said information comprises a re-submitted instance of the seed or output response, said verification by the wallet application comprising either: i) verifying that the same transform applied to the re-submitted instance of the seed or output response equals a stored attestation of the seed or output response respectively, or ii) re-determining the seed from the re-submitted instance of the output response and verifying that the same transform applied to the re-determined seed equals the stored attestation of the seed.

7. The method of claim 6, wherein said re-submitted instance of the seed or output response is a re-generated instance generated by the user re-inputting an instance of the input challenge into the PUF device.

8. The method of claim 1, wherein said transform comprises an encrypted version of the seed or output response, and said information comprises a password or passcode, said verification by the wallet application comprising: verifying the password or passcode and decrypting the encrypted version of the seed or output response on condition thereof.

9. The method of claim 8, wherein the password or passcode comprises a decryption key and said verifying and decrypting comprise using the decryption key to decrypt the encrypted version of the seed or output response.

10. The method of claim 8, wherein the wallet application stores a decryption key in association with the wallet application, the password or passcode comprising a different piece of information, wherein said decryption comprises releasing the decryption key to decrypt the encrypted version of the seed or output response on condition of verifying the supplied password or passcode.

11. The method of claim 8, wherein said information further comprises a re-submitted instance of the seed or output response, and said verification by the wallet application further comprises verifying that the decrypted seed or response is equal to the re-submitted instance of the seed or output response, respectively.

12. The method of claim 11, wherein said re-submitted instance of the seed or output response is a re-generated instance generated by the user re-inputting an instance of the input challenge into the PUF device.

13. The method of claim 1, wherein the PUF device including the PUF is housed within a self-contained housing.

14. The method of claim 13, wherein said inputting of the input challenge is performed through a built-in user interface incorporated in the housing of the PUF device.

15. The method of claim 14, wherein the PUF device comprises no interface for receiving data other than said user interface.

16. The method of claim 13, wherein the wallet application is installed and run on a computer housed in a separate housing than the PUF device, and said transform of the seed is stored on said computer; wherein the PUF device comprises an inter-device interface for communicating with the computer in order to output the output response to the wallet application on the computer in order for the wallet application to perform said determination of the seed; and wherein a user inputs said information via a user interface of the computer, and the blockchain transaction is signed on the computer and transmitted from said computer to be recorded on the blockchain.

17. The method of claim 16, wherein said inter-device interface is a direct local interface.

18. The method of claim 17, wherein said interface comprises one of:

a USB connector for connecting to the computer via a USB port of the computer; or a screen arranged to display the output response in graphical form, to be read by a camera or scanner of the computer.

19. The method of claim 13, wherein the wallet application is incorporated within the PUF device, and said transform of the seed is stored within PUF the device; wherein said inputting of the input challenge is performed through a built-in user interface incorporated in the housing of the PUF device, and a user enters said information via the built in user interface of the PUF device; and wherein the blockchain transaction is signed on the PUF device and transmitted from the PUF device to be recorded on the blockchain.

20. The method of claim 19, wherein the blockchain transaction is transmitted via a local interface of the PUF device to a separate computer, and then onward via a network interface of the computer.

21. The method of claim 19, wherein the blockchain transaction is transmitted directly via a network interface incorporated in the PUF device.

22. The method of claim 16, wherein the output response is not stored on the computer, or at least not in-the-clear.

23. The method of claim 13, wherein the housing of the PUF device is locked or sealed.

24. The method of claim 1, wherein the output response is not stored anywhere, or at least not in-the-clear.

25. A PUF device comprising, incorporated within a same housing:
- a built-in user interface for inputting an input challenge;
- a physically unclonable function, PUF, wherein the PUF device is configured to generate a corresponding output response based on the input challenge and the PUF in response to the inputting of the input challenge;
- embedded memory comprising one or more memory units; and
- an embedded processor arranged to run a blockchain wallet application stored in part of said embedded memory, wherein the blockchain wallet application is arranged to be instantiated to use a seed determined from the output challenge as generated by the PUF device, wherein said instantiating comprises storing a transform of the seed or output response in a part of the embedded memory;
- wherein the user interface is further operable to receive, from a user, information demonstrating a right to use the seed;
- wherein the wallet application is configured so as in response to verifying said information based on said transform as stored in association with the wallet application, and on condition that the information is thereby verified, to derive at least one child key from the seed;
- wherein the wallet application is operable to sign a blockchain transaction using the child key as derived by the wallet application in response to the verification; and
- wherein the PUF device further comprises a data interface configured to transmit the signed blockchain transaction to be recorded on a blockchain.

* * * * *